United States Patent
Rahman

(10) Patent No.: US 12,335,136 B2
(45) Date of Patent: Jun. 17, 2025

(54) MANAGING DISTRIBUTION ACCESS AMONG AND ACROSS MULTIPLE COMMUNICATION NETWORKS

(71) Applicant: AT&T Intellectual Property I, L.P., Atlanta, GA (US)

(72) Inventor: Moshiur Rahman, Marlboro, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 565 days.

(21) Appl. No.: 17/658,785

(22) Filed: Apr. 11, 2022

(65) Prior Publication Data
US 2023/0327982 A1     Oct. 12, 2023

(51) Int. Cl.
| | |
|---|---|
| H04L 45/28 | (2022.01) |
| H04L 45/00 | (2022.01) |
| H04W 28/08 | (2023.01) |
| H04W 36/14 | (2009.01) |
| H04W 36/30 | (2009.01) |
| H04W 40/36 | (2009.01) |

(52) U.S. Cl.
CPC .......... *H04L 45/28* (2013.01); *H04L 45/22* (2013.01); *H04W 28/0925* (2020.05); *H04W 28/0958* (2020.05); *H04W 36/14* (2013.01); *H04W 36/305* (2018.08); *H04W 40/36* (2013.01)

(58) Field of Classification Search
None
See application file for complete search history.

(56) References Cited

U.S. PATENT DOCUMENTS

| | | | |
|---|---|---|---|
| 8,159,940 B1* | 4/2012 | Helmy | H04L 45/28 370/235 |
| 2015/0195192 A1* | 7/2015 | Vasseur | H04L 45/28 714/47.3 |
| 2018/0286200 A1* | 10/2018 | Gordon | G08B 29/18 |

(Continued)

OTHER PUBLICATIONS

The Hybrid Fiber Coaxial HFC Network, https://www.ccexpert.us/telecommunications/the-hybrid-fibercoaxial-hfc-network.html, Jan. 7, 2022, 2 pgs.

(Continued)

*Primary Examiner* — Saumit Shah

(57) ABSTRACT

Distribution access channels among and across multiple communication networks can be managed. A distribution access management component (DAMC) can monitor communication conditions of communication channels across multiple communication networks employing respective communication technologies. During a data session between a data source device and communication device via a first communication channel associated with a first communication network, and in response to determining a failure of the first communication channel, DAMC can determine whether data traffic of the data session is to be re-routed from the first communication channel to a second communication channel associated with a second communication network based on a policy. If the policy indicates re-routing can be performed, DAMC can facilitate establishing the second communication channel, and data traffic of the data session can be re-routed via the second communication channel until the failure of the first communication channel is remedied.

20 Claims, 10 Drawing Sheets

(56) References Cited

U.S. PATENT DOCUMENTS

| | | | |
|---|---|---|---|
| 2022/0030062 A1* | 1/2022 | Jennings | H04L 67/1097 |
| 2022/0255736 A1* | 8/2022 | Lee | H04L 9/0852 |
| 2023/0308968 A1* | 9/2023 | Sarkar | H04W 36/0085 |
| 2024/0259913 A1* | 8/2024 | Haustein | H04W 76/15 |

OTHER PUBLICATIONS

Cable CTMS/CCAP, https://www.microsemi.com/applications/access-metro-network/cable-cmts, date last accessed Mar. 11, 2022, 3 pgs.
Remote PHY transforms your cable access network, White paper Cisco Public, https://www.cisco.com/c/dam/en/us/solutions/collateral/service-provider/cable-access-solutions/white-paper-sp-r-phy-transform-cable-access-network.pdf, date last accessed Mar. 15, 2022, 7 pgs.

* cited by examiner

MANAGING DISTRIBUTION ACCESS AMONG AND ACROSS MULTIPLE COMMUNICATION NETWORKS

TECHNICAL FIELD

This disclosure relates generally to electronic communications, e.g., to managing distribution access among and across multiple communication networks.

BACKGROUND

Communication devices can communicate data to other communication devices via communication networks. For example, a communication device (e.g., a wired communication device (e.g., a computer; an Internet protocol (IP) television (IPTV); or other type of wired communication device) or a wireless communication device (e.g., mobile, cell, or smart phone; electronic tablet or pad; or other type of wireless communication device)) can communicate data to other communication devices via an IP-based network (e.g., the Internet, an intranet, or other IP-based network). As another example, a wireless communication device can connect to and communicate with a wireless communication network (e.g., core network), via a base station associated with the wireless communication network, to communicate with another communication device connected to the wireless communication network or to another communication network (e.g., IP-based network, such as the Internet) associated with (e.g., communicatively connected to) the wireless communication network. The wireless communication device can, for instance, communicate information to a base station and associated wireless communication network (e.g., core network) via an uplink and can receive information from the base station (and associated wireless communication network) via a downlink. The wireless communication network itself can be an IP-based network.

The above-described description is merely intended to provide a contextual overview regarding electronic communications, and is not intended to be exhaustive.

DETAILED DESCRIPTION

Figure 1:
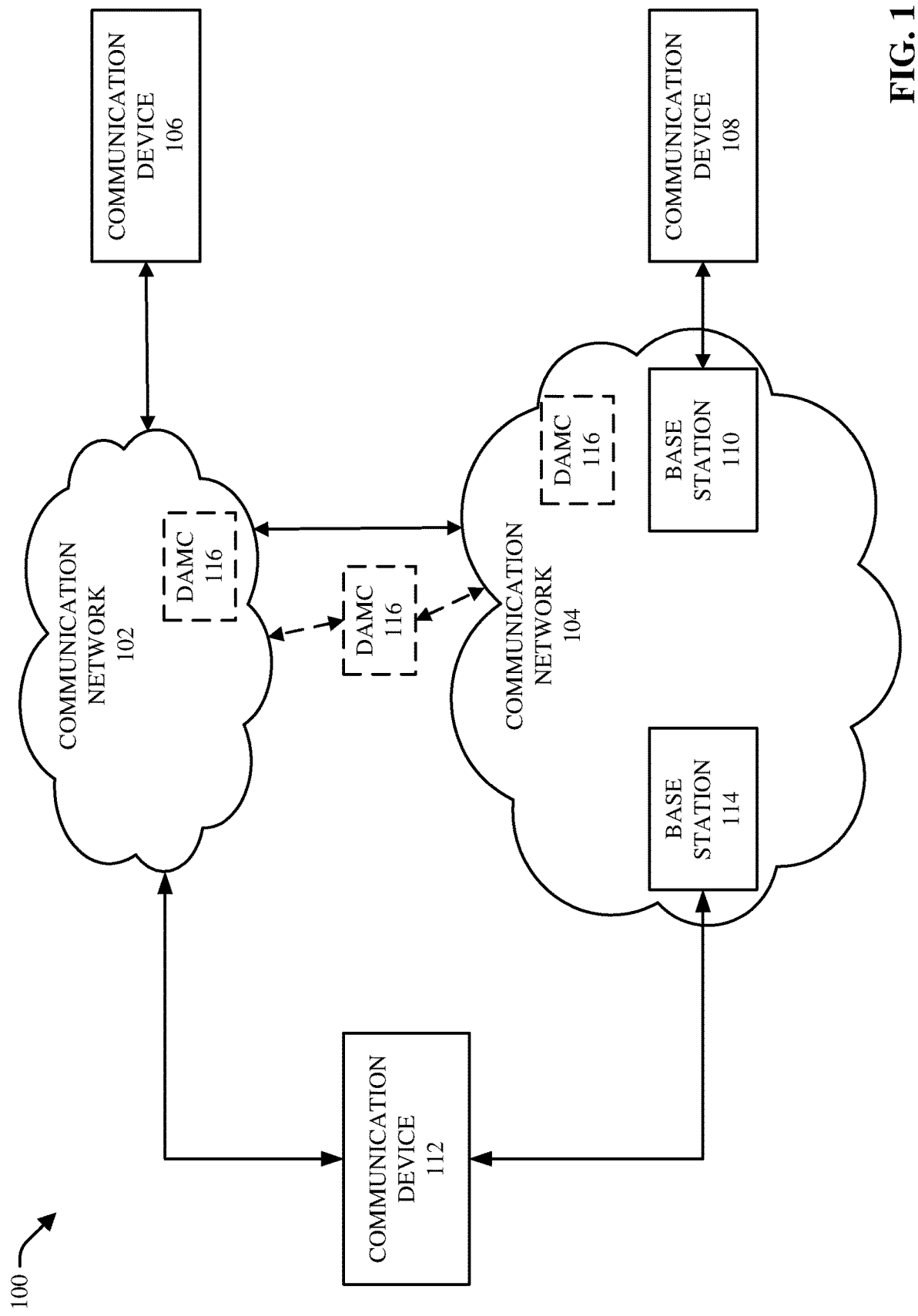
FIG. 1 illustrates a block diagram of an example system that can manage distribution access channels among and across multiple communication networks, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects and embodiments that relate to managing distribution access across multiple communication networks. The disclosed subject matter can provide various benefits to users using communication devices in a communication network, service providers that provide services to communication devices, and carriers (e.g., mobile carriers) and other organizations that operate communication networks. The disclosed subject matter, by desirably managing distribution access across multiple communication networks, can enhance (e.g., increase, improve, or optimize) operation, performance, and efficiency of communication networks, such as, for example, cable communication networks, wireless (e.g., a mobile, cellular, or other wireless) communication networks, and other types of communication networks, such as described herein.

Various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2

(3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also can employ massive MIMO systems (e.g., hundreds of antennas at the transmitter side and receiver side). Typically, with a $(N_t, N_r)$, where $N_t$ denotes the number of transmit antennas and $N_r$ denotes the number of receive antennas, the peak data rate can multiply with a factor of $N_t$ over single antenna systems in a rich scattering environment.

Communication devices can communicate data to other communication devices via communication networks. For example, a communication device (e.g., a wired communication device (e.g., a computer; an Internet protocol (IP) television (IPTV); or other type of wired communication device) or a wireless communication device (e.g., mobile, cell, or smart phone; electronic tablet or pad; or other type of wireless communication device)) can communicate data to other communication devices via an IP-based network (e.g., the Internet, an intranet, or other IP-based network). As another example, a wireless communication device can connect to and communicate with a wireless communication network (e.g., core network), via a base station associated with the wireless communication network, to communicate with another communication device connected to the wireless communication network or to another communication network (e.g., IP-based network, such as the Internet) associated with (e.g., communicatively connected to) the wireless communication network. The wireless communication device can, for instance, communicate information to a base station and associated wireless communication network (e.g., core network) via an uplink and can receive information from the base station (and associated wireless communication network) via a downlink. The wireless communication network itself can be an IP-based network that can process and communicate packets of data, in accordance with an IP and/or other communication network protocols.

There can be instances where, during a data session, a communication channel between a communication device and another communication device associated with a communication network can experience a problem that can prevent or negatively impact communication of data traffic via the communication channel. For example, a node(s) of the communication network that is being utilized as part of the communication channel can fail (e.g., can be non-operational) or can otherwise be experiencing problems that can prevent or negatively impact communication of data traffic between the communication devices via the communication channel. This can be undesirable, and can result in an undesirable experience for the users of the communication devices, particularly when the data traffic has a higher level of importance or criticality to users (e.g., data traffic associated with mission critical services, disaster management services, emergency services, health-related services, law enforcement services, military services, or otherwise has a higher level of priority, importance, or criticality).

It can be desirable to mitigate (e.g., prevent, reduce, or minimize) interruption of the communication of the data traffic between communication devices when there is a problem (e.g., failure, malfunction, or impairment) of a communication channel between the communication devices and enhance the user experience with regard to communication of data traffic. Also, since network resources (e.g., quantum interfaces, quantum nodes, or other network resources) of a communication network can be non-finite (e.g., may be limited) and can involve certain costs (e.g., financial costs and/or other resource-related costs), it can be desirable to manage the network resources, communication channels, and the communication of data traffic in communication networks in a cost effective and efficient manner.

To that end, techniques for managing distribution access channels among and across multiple communication networks are presented. The disclosed subject matter can comprise a distribution access management component (DAMC)

that can desirably manage distribution access channels among and across the communication networks, including desirably determining whether to re-route data traffic due to a problem with a communication channel (e.g., a distribution access channel), in accordance with defined communication management criteria. The defined communication management criteria can be based at least in part on a policy that can indicate the conditions under which re-routing of data traffic is to be performed. In some embodiments, the DAMC can be or can comprise an IP and quantum enabled intelligent module (QIM) that can be located in one or more of the communication networks or can be associated with (e.g., communicatively connected to) the communication networks, such as described herein.

The DAMC can monitor communication conditions associated with communication channels (e.g., distribution access channels) across the multiple communication networks that can employ respective communication technologies. For instance, a first communication channel associated with a first communication network can employ a first communication technology (e.g., cable communication network that can employ a cable or wireline communication technology). A second communication network can employ a second communication technology (e.g., cellular or wireless communication network can employ cellular or wireless communication technology).

During a data session between a data source device and a communication device via a first communication channel associated with the first communication network, the DAMC can monitor communication conditions associated with the first communication channel. In some embodiments, the first communication channel can comprise a quantum connection (e.g., quantum link). The data source device can be a common data source that can have the ability to communicate data traffic via the first communication network or the second communication network. The DAMC can receive communication conditions data relating to the communication conditions associated with the first communication channel, and can analyze the communication conditions data. Based at least in part on the results of analyzing the communication conditions data, the DAMC can determine whether the first communication channel is experiencing a problem (e.g., failure, malfunction, or impairment) in connection with communicating the data traffic between the data source device and communication device via the first communication channel.

If the DAMC determines that there is a problem associated with the first communication channel, the DAMC can determine whether data traffic of the data session is to be re-routed from the first communication channel to a second communication channel associated with the second communication network based at least in part on the policy, which can indicate or specify the conditions under which re-routing of data traffic to another communication channel associated with another communication network is to be performed (e.g., is permitted or authorized to be performed). If the results of analyzing policy information of the policy indicates that re-routing of the data traffic associated with the data source device and communication device is not to be performed, the DAMC can determine that the data traffic is not to be re-routed. If, instead, the results of analyzing policy information of the policy indicates that re-routing of the data traffic associated with the data source device and communication device can be performed, the DAMC can facilitate establishing a second communication channel associated with the second communication network, wherein the second communication channel can be between the data source device and communication device. For instance, the DAMC can facilitate establishing the second communication channel such that it can bypass the portion (e.g., node(s)) of the first communication network that is experiencing the problem by proceeding through the second communication network, wherein the second communication network, and associated second communication channel, can be associated with (e.g., communicatively connected to) another portion of the first communication network that is operating in a desirable manner, and the second communication channel can proceed through this other portion of the first communication network to the communication device associated with the first communication network. For example, the second communication channel can extend from the data source device through the second communication network (e.g., through the second core portion of the second communication network) to a second backhaul portion of the second communication network, bypassing the portion (e.g., first core portion) of the first communication network that is experiencing the problem, and, as part of the second communication channel, the second backhaul portion can be connected (e.g., via a quantum connection or other type of communication connection) to a first backhaul portion of the first communication network, wherein the second communication channel can extend from the first backhaul portion of the first communication network to the communication device connected to the first communication network. The data traffic (e.g., a second portion of the data traffic) of the data session of the data source device and communication device can be re-routed via the second communication channel until the problem associated with the first communication channel is remedied (e.g., corrected, repaired, rectified, or mitigated).

The DAMC can continue to monitor communication channels, including the first communication channel, associated with the communication networks. If, based on analysis of communication conditions data (e.g., subsequent communication conditions data) relating to communication conditions associated with the first communication channel, the DAMC determines that the problem associated with the first communication channel has been remedied, the DAMC can facilitate re-routing the data traffic (e.g., a third portion of the data traffic) of the data session of the data source device and communication device via the first communication channel established (e.g., re-established) between the data source device and communication device.

These and other aspects and embodiments of the disclosed subject matter will now be described with respect to the drawings.

Referring now to the drawings, FIG. 1 illustrates a block diagram of an example system 100 that can manage distribution access channels among and across multiple communication networks, in accordance with various aspects and embodiments of the disclosed subject matter. The system 100 can comprise a first communication network 102 that can employ a first communication technology (e.g., a first type of communication technology), such as cable or other wireline communication technology, to communicate data traffic between communication devices. The first communication network 102 can be an IP-based network that can process and communicate data packets, in accordance with a desired IP or other communication network protocols (e.g., an Internet protocol suite, such as transmission control protocol (TCP)/IP).

The system 100 also can comprise a second communication network 104 that can employ a second communication technology (e.g., a second type of communication technology), such as a wireless, cellular, or mobile communication technology, to communicate data traffic between communication devices. The second communication network 104 also can be an IP-based network that can process and communicate data packets, in accordance with a desired IP or other communication network protocols (e.g., an Internet protocol suite, such as transmission control protocol (TCP)/IP), as well as in accordance with a desired wireless communication protocol(s).

Communication devices can be connected to the first communication network 102 and/or second communication network 104 at various times. For instance, a communication device 106 can be connected to the first communication network 102 via a wired (e.g., wireline) communication connection (e.g., a cable modem connection or other type of wired communication connection). A communication device 108 can be connected to the second communication network 104 via a wireless communication connection to a base station 110 of the second communication network 104. In some embodiments, a communication device 112 can be connected to, or at least can have the capability to connect to, the first communication network 102 via a wired communication connection and/or can be connected to, or at least can have the capability to connect to, the second communication network 104 via a wireless communication connection to a base station 114 of the second communication network 104. In certain embodiments, the communication device 112 can be a data source device that can be a data source (e.g., a common video or data source) that can communicate data (e.g., streamed or stored video, audio, or multimedia data, or other type of data) to other communication devices (e.g., communication device 106 or communication device 108).

A communication device (e.g., 106, 108, or 112) (or user equipment (UE), device, or other similar term) can refer to any type of wired or wireless device that can communicate with a network node in a wired communication system and/or a radio network node in a cellular or mobile communication system. Examples of communication devices can include, but are not limited to, a computer (e.g., a desktop computer, a laptop computer, laptop embedded equipment (LEE), laptop mounted equipment (LME), or other type of computer), a mobile terminal, a cellular and/or smart phone, a tablet or pad (e.g., an electronic tablet or pad), an electronic notebook, an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a set-top box, an IP television (IPTV), a device to device (D2D) UE, a machine type UE or a UE capable of machine to machine (M2M) communication, a Personal Digital Assistant (PDA), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), a music or media player, speakers (e.g., powered speakers having wireless communication functionality), an appliance (e.g., a toaster, a coffee maker, a refrigerator, or an oven, or other type of appliance having wireless communication functionality), a device associated or integrated with a vehicle (e.g., automobile, airplane, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs). In some embodiments, a communication device (e.g., 106) can be connected to the first communication network 102 via a wired communication connection (e.g., via a cable modem connection or other type of wired communication connection). In certain embodiments, a communication device (e.g., 108) can be connected to the second communication network 104 via a wireless communication connection. In still other embodiments, a communication device (e.g., 112), such as a data source device, can be connected to, or at least can have the capability to be connected to, the first communication network 102 via a wired communication connection and the second communication network 104 via a wireless communication connection.

At various times, and under various scenarios, a user of a communication device (e.g., 106, 108, or 112) can desire to utilize one or more applications and associated services and/or can desire to communicate with another communication device (e.g., 112) associated with another user or entity (e.g., service provider). The applications and services can relate to, for example, video streaming, video calls, video content, audio streaming, audio calls, audio content, electronic gaming, text messaging, multimedia messaging, emails, website content, medical information (e.g., medical information from wireless medical devices associated with users), utility information (e.g., utility information from smart meters), emergency-related information, military-related information, law enforcement-related information, fire response services-related information, disaster response services-related information, and/or other desired types of information, content, or activities. Utilization of some applications and services under some scenarios (e.g., using an application or service for video streaming, a video call, electronic gaming, certain medical-related data communications, or certain emergency, military, law enforcement, fire response, disaster response data communications) may involve a heavier level of data traffic, and/or can involve higher priority data traffic (e.g., data traffic that can have a higher level of priority, importance, or criticality), being communicated via a communication network (e.g., communication network 102 or communication network 104) than relatively lighter data traffic, and/or relatively lower priority data traffic, that can be communicated when certain applications or services are utilized under other scenarios (e.g., using an application or service for communicating an ordinary text message, browsing an ordinary email, or viewing a web page).

As disclosed, there can be instances where, during a data session involving communication devices (e.g., communication devices 106 and 112, or communication devices 108 and 112), a communication channel between a communication device and another communication device associated with a communication network (e.g., first communication network 102 or second communication network 104) can experience a problem (e.g., failure, malfunction, or impairment associated with the communication channel) that can prevent or negatively impact communication of data traffic via the communication channel. This can be undesirable, and can result in an undesirable experience for the users of the communication devices, particularly when the data traffic has a higher level of importance or criticality to users.

In accordance with various embodiments, the system 100 can comprise a distribution access management component (DAMC) 116 that can desirably manage distribution access channels of and across the communication networks (e.g., 102, 104), in accordance with the defined communication management criteria, such as described herein. The DAMC 116, by desirably (e.g., suitably, efficiently, enhancedly, or optimally) managing the distribution access channels, can desirably mitigate (e.g., prevent, reduce, or minimize) interruption of the communication of the data traffic between communication devices when there is a problem (e.g., failure, malfunction, or impairment) of a communication channel between the communication devices and can enhance the user experience with regard to communication of data traffic. Also, the DAMC 116 can desirably manage the network resources, communication channels, and the communication of data traffic in communication networks in a cost effective and efficient manner, in accordance with a policy, and corresponding communication management criteria, which can indicate or specify the conditions under which re-routing of data traffic from one communication channel (e.g., a communication channel experiencing a problem) of one communication network to another communication channel associated with another communication network is to be performed (e.g., is permitted or authorized to be performed). This can be beneficial, since network resources (e.g., quantum interfaces, quantum nodes, or other network resources) of a communication network (e.g., 102, 104) can be non-finite (e.g., may be limited) and can involve certain costs (e.g., financial costs and/or other resource-related costs), and there can be costs involved in re-routing data traffic from one communication channel to another communication channel.

In accordance with various embodiments, a DAMC 116 can reside in the first communication network 102 or the second communication network 104, and/or can reside outside of, and can be communicatively connected to, the first and second communication networks. In some embodiments, the DAMC 116 can be or can comprise a QIM that can desirably manage communication connections (e.g., quantum links) and facilitate provision of services and features, including, for example, desirable QoS (e.g., desirably high and reliable QoS), disaster recovery and cable and wireless backhaul sharing, quantum networking services, data security and encryption services, business services, residential services, and/or other desired services, such as described herein.

Figure 2:
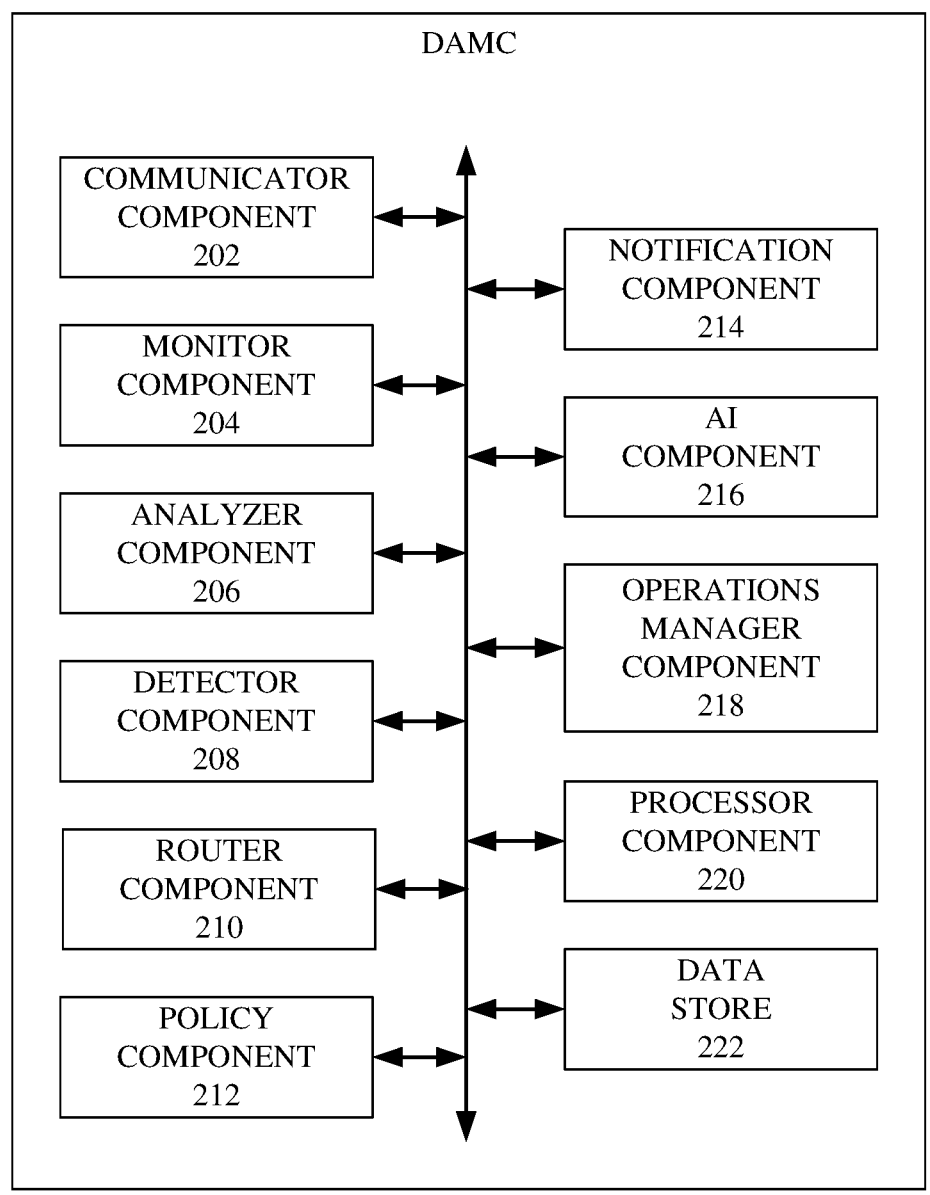
FIG. 2 depicts a distribution access management component, in accordance with various aspects and embodiments of the disclosed subject matter.

Referring to FIG. 2 (along with FIG. 1), FIG. 2 depicts a DAMC 116, in accordance with various aspects and embodiments of the disclosed subject matter. The DAMC 116 can comprise a communicator component 202, a monitor component 204, an analyzer component 206, a detector component 208, a router component 210, a policy component 212, a notification component 214, an artificial intelligence (AI) component 216, an operations manager component 218, a processor component 220, and a data store 222.

The communicator component 202 can receive or transmit information from or to other components or devices, including network components, devices, or equipment of the communication networks (e.g., 102, 104) and/or communication devices (e.g., 106, 108, 112). For instance, the communicator component 202 can receive communication conditions data from network components (e.g., network devices, equipment, or other components) of the communication networks (e.g., 102, 104) and/or communication devices (e.g., 106, 108, 112). The communication conditions data can relate to (e.g., can be representative of) or indicate communication conditions of or associated with communication channels, network components, and/or communication devices. The communication conditions can comprise or relate to, for example, data communication rate or speed, data throughput, signal-to-interference-plus-noise ratio (SINR), reference signal received power (RSRP), reference signal received quality (RSRQ), channel quality indicator (CQI), QoS, and/or other wireline or wireless communications metrics, parameters, or conditions. The communicator component 202 also can communicate information, such as, for example, notification messages, to network components and/or communication devices. Notification messages can, for example, notify desired network components and/or communication devices about re-routing of data traffic from one communication channel (e.g., a distribution access channel that is experiencing a problem) to another communication channel, such as described herein.

The monitor component 204 can monitor communication conditions associated with communication channels (e.g., distribution access channels) associated with or across the multiple communication networks (e.g., first communication network 102 and second communication network 104) that can employ respective communication technologies. For example, during a data session between the communication device 112 (e.g., data source device) and the communication device 106 via a first communication channel associated with the first communication network 102, the monitor component 204 can monitor communication conditions associated with the first communication channel during the data session. For instance, the monitor component 204 can monitor or receive communication conditions data associated with the first communication channel to facilitate monitoring the first communication channel.

The analyzer component 206 can analyze the communication conditions data associated with communication channels, network components, and/or communication devices to facilitate detecting any problems that may occur with communication channels. For example, with regard to the example data session associated with communication device 106 and communication device 112, the analyzer component 206 can analyze communication conditions data associated with the first communication channel to facilitate determining whether there is any problem associated with the first communication channel and the communication of data traffic via the first communication channel.

The DAMC 116 can employ the detector component 208 to determine or detect whether a communication channel is experiencing a problem (e.g., failure, malfunction, or impairment) in connection with the communication of data traffic between communication devices via the communication channel, based at least in part on the results of an analysis of communication conditions data associated with the communication channel. For instance, with regard to the example data session, based at least in part on the results of the analysis of the communication conditions data associated with the first communication channel, the detector component 208 can determine or detect whether the first communication channel is experiencing a problem in connection with the communication of data traffic between the communication device 112 and communication device 106 via the first communication channel.

If, based at least in part on the results of the analysis of the communication conditions data, the detector component 208 does not detect a problem with a communication channel (e.g., first communication channel), the DAMC 116 can continue to have the monitor component 204 monitor communication conditions associated with the communication channel. If, instead, based at least in part on the results of the analysis of the communication conditions data, the detector component 208 determines that there is a problem associated with the first communication channel (e.g., a problem that may make re-routing of the data traffic to a second communication channel desirable), the DAMC 116 can employ a router component 210 that can determine whether data traffic of the data session associated with the communication devices (e.g., 106, 112) is to be re-routed from the first communication channel associated with the first communication network 102 to a second communication channel associated with the second communication network 104 based at least in part on the policy (and associated communication management criteria). The policy component 212 can comprise policy information relating to (e.g., representative of) the policy, wherein the policy (and associated communication management criteria) can indicate or specify the conditions under which re-routing of data traffic to another communication channel associated with another communication network is to be performed (e.g., is permitted or authorized to be performed). The policy can be specified based at least in part on a preference of an entity (e.g., communication network provider, service provider, or other entity), and the policy can be structured to desirably balance the costs of re-routing data traffic from one communication channel associated with one communication network to another communication channel associated with another communication network in relation to the desire (e.g., want, need, or requirement) for the data traffic to be communicated via a communication channel (e.g., to a desired destination communication device), wherein the type of data traffic, type of application or service associated with the data traffic, QoS, and/or the importance, criticality, or priority level associated with the data traffic can be indicative of how high the desire is for the data traffic to be communicated via a communication channel. The data traffic re-routing policies in the policy can be different based at least in part on the respective types of data traffic, respective types of services associated with respective data traffic, the respective importance, criticality, or priority levels associated with the respective data traffic, and/or preferences of an entity.

The router component 210 (e.g., in conjunction with the analyzer component 206) can analyze the policy information of the policy to determine which data traffic re-routing policy to apply to the data traffic for the data session under consideration and to facilitate determining whether the data traffic of the data session can be re-routed (e.g., is permitted to be re-routed). In some embodiments, the policy information of the policy can comprise conditions under which data can be re-routed (e.g., can be permitted to be re-routed) from one communication channel associated with one communication network to another communication channel associated with another communication network when a problem is detected with the communication channel In certain embodiments, some of the conditions can relate to or involve one or more defined threshold characteristic values associated with one or more characteristics that can be utilized (e.g., applied) to facilitate determining whether a condition(s) for re-routing data traffic from one communication channel to another communication channel has been satisfied (e.g., met; or breached). The defined threshold characteristic values associated with the characteristics can be determined based at least in part on the defined communication management criteria and/or preferences of users (e.g., service provider, end user, or other entity (e.g., an authorized user or entity)).

As an example, a condition of the policy can indicate or specify that data traffic can be re-routed from one communication channel associated with one communication network to another communication channel associated with another communication network, due to a problem associated with the communication channel, if the characteristic value (e.g., importance, criticality, or priority level; QoS level; data communication rate; or other characteristic value) associated with a characteristic associated with the data traffic of a data session satisfies (e.g., meets or exceeds; is at or greater than; or otherwise satisfies) a defined threshold characteristic value (e.g., defined threshold importance, criticality, or priority level; defined threshold QoS level; defined threshold data communication rate; or other type of threshold characteristic value) associated with the characteristic. The router component 210 can analyze (e.g., compare) the characteristic value of the characteristic associated with the data traffic of the data session and the defined threshold characteristic value associated with the characteristic. If the router component 210 determines that the characteristic value of the characteristic associated with the data traffic of the data session satisfies the defined threshold characteristic value associated with the characteristic, the router component 210 can determine that the data traffic can be re-routed to the other communication channel associated with the other communication network (unless there is another applicable condition of the policy that indicates such data traffic is not to be re-routed and such other applicable condition overrides the re-routing determination to re-route the data traffic, as specified by the defined communication management criteria and corresponding policy). If, instead, the router component 210 determines that the characteristic value of the characteristic associated with the data traffic of the data session does not satisfy (e.g., does not meet or exceed; is less than; or otherwise does not satisfy) the defined threshold characteristic value associated with the characteristic, the router component 210 can determine that the data traffic is not to be re-routed to the other communication channel associated with the other communication network (unless there is another applicable condition of the policy that indicates such data traffic is to be re-routed and such other applicable condition overrides the re-routing determination to not re-route the data traffic, as specified by the defined communication management criteria and corresponding policy).

If the results of analyzing the policy information of the policy indicates that re-routing of the data traffic associated with the data source device and communication device is not to be performed, the router component 210 can determine that the data traffic of the data session involving the communication device 106 and communication device 112 is not to be re-routed (e.g., the communication of data traffic via the first communication channel can be interrupted or otherwise impaired, instead of re-routing the data traffic to another communication channel).

If, instead, the results of analyzing policy information of the policy indicates that re-routing of the data traffic of the data session involving the communication device 106 and communication device 112 can be performed, the router component 210 can facilitate establishing a second communication channel associated with the second communication network 104, wherein the second communication channel can be between the communication device 106 and communication device 112, and can partially be routed through the second communication network 104 to facilitate bypassing the portion of the first communication network 102, including the portion of the first communication channel, that is experiencing the problem. In some embodiments, the router component 210 can determine, establish or facilitate establishing, or generate or facilitate generating a second communication channel associated with the second communication network 104 that can be utilized to communicate the data traffic of the data session based at least in part on routing-related information (e.g., routing-related information in a routing table, such as a local logic table) that can indicate or specify an alternate communication path(s) to the data source (e.g., communication device 112) and/or the data destination (e.g., communication device 106). The routing-related information also can indicate nodes, components, or devices of or associated with the second communication network 104 or first communication network 102 that can be utilized, instantiated, or created to facilitate the re-routing of the data traffic.

For instance, the router component 210 can facilitate establishing the second communication channel such that the second communication channel can follow an alternate communication path that can extend from the data source (e.g., communication device 112) and bypass the portion (e.g., node(s)) of the first communication network 102 that is experiencing the problem by proceeding through the second communication network 104 (e.g., proceeding through the wireless core portion of the second communication network 104 to the backhaul portion of the second communication network 104), wherein the second communication network 104, and associated second communication channel, can be associated with (e.g., communicatively connected to) another portion (e.g., backhaul portion) of the first communication network 102 that is operating in a desirable (e.g., acceptable, suitable, or optimal) manner, and the second communication channel can proceed through this other portion of the first communication network 102 to the communication device 106 associated with the first communication network 102. For example, the second communication channel can extend from the communication device 112 (e.g., data source device) through the second communication network (e.g., through the second core portion of the second communication network 104) to a second backhaul portion of the second communication network 104, bypassing the portion (e.g., first core portion) of the first communication network 102 that is experiencing the problem, and, as part of the second communication channel, the second backhaul portion can be connected (e.g., via a quantum connection or other type of communication connection) to a first backhaul portion of the first communication network 102, wherein the second communication channel can extend from the first backhaul portion of the first communication network 102 to the communication device 106 connected to the first communication network 102. The data traffic (e.g., a second portion of the data traffic) of the data session involving the communication device 112 and communication device 106 can be re-routed via the second communication channel until the problem associated with the first communication channel is remedied (e.g., corrected, repaired, rectified, or mitigated).

In connection with establishing the second communication channel and re-routing of the data traffic of the data session via the second communication channel, the DAMC 116 can employ the notification component 214 to generate notification or instruction messages, wherein the notification component 214 (e.g., in conjunction with the communicator component 202) can communicate the notification or instruction messages to desired network components associated with the communication networks (e.g., 102, 104) and/or communication devices (e.g., communication device 112) to notify or instruct (e.g., command) the desired network components and/or communication devices that the data traffic of the data session is to be re-routed from the first communication channel associated with the first communication network 102 to the second communication channel associated with the second communication network 104. The notification component 214 (e.g., via the messages) also can notify desired network components (e.g., network component of any northbound central monitoring system) associated with the communication networks that there is a problem associated with the first communication channel.

The DAMC 116, employing the monitor component 204, can continue to monitor communication channels, including the first communication channel, associated with the communication networks (e.g., 102, 104). If, based on the results of the analysis of communication conditions data (e.g., subsequent communication conditions data) relating to communication conditions associated with the first communication channel, the detector component 208 determines that the problem associated with the first communication channel has been remedied, the router component 210 can facilitate re-routing the data traffic (e.g., a third portion of the data traffic) of the data session involving the communication device 112 and communication device 106 via the first communication channel established (e.g., re-established) between the communication device 112 and communication device 106 (or via an established communication channel associated with the first communication network 102 that can correspond to the first communication channel). For instance, the router component 210 (e.g., in conjunction with the notification component 214) can instruct (e.g., via notification or instruction messages) desired network components and/or communication devices to re-route the data traffic (e.g., a third portion of the data traffic) of the data session involving the communication device 112 and communication device 106 via the first communication channel (or other corresponding communication channel associated with the first communication network 102) established (e.g., re-established) between the communication device 112 and communication device 106.

In some embodiments, in a manner similar to the example re-routing of data traffic of the data session involving the communication device 106 and communication device 112, the DAMC 116 can re-route, or at least determine whether to re-route, data traffic of a data session involving the communication device 108 and communication device 112, in accordance with the policy (and associated communication management criteria). For instance, the monitor component 204 can monitor communication conditions associated with a communication channel (e.g., a different second communication channel) associated with the second communication network 104 and between the communication device 108 and communication device 112 (wherein this communication channel can be a different second communication channel (and different communication path) than the second communication channel described above with regard to the data session involving the communication device 106 and communication device 112).

If the detector component 208 detects a problem with the communication channel based at least in part on the results of an analysis (e.g., by the analyzer component 206) of the communication conditions data relating thereto, the router component 210 can determine whether to re-route the data traffic from the communication channel associated with the second communication network 104 to another communication channel associated with the first communication network 102 (e.g., another communication channel at least partially routed through the first communication network 102) based at least in part on the results of an analysis of the policy, in accordance with the defined communication management criteria. If the router component 210 determines that such data traffic is to be re-routed to another communication channel, the router component 210 can facilitate establishing the other communication channel associated with the first communication network 102, including the portion of such other channel that can extend from the first communication network 102 to the second communication network 104, and can instruct (e.g., via messages from the notification component 214) desired network components and/or communication devices to re-route the data traffic from the communication channel associated with the second communication network 104 to the other communication channel associated with the first communication network 102 (and partially routed through a desirably operational portion of the second communication network 104 associated with the communication device 108) to facilitate desirably routing the data traffic between the communication device 112 and communication device 108.

The monitor component 204 can continue to monitor communication channels, including the communication channel associated with the second communication network 104. If, based on the results of the analysis of communication conditions data (e.g., subsequent communication conditions data) relating to communication conditions associated with the communication channel, the detector component 208 determines that the problem associated with the communication channel has been remedied, the router component 210 can facilitate re-routing the data traffic (e.g., another portion of the data traffic) of the data session involving the communication device 112 and communication device 108 via the original communication channel (or other corresponding communication channel associated with the second communication network 104) established (e.g., re-established) between the communication device 112 and communication device 108, such as described herein.

Figure 3:
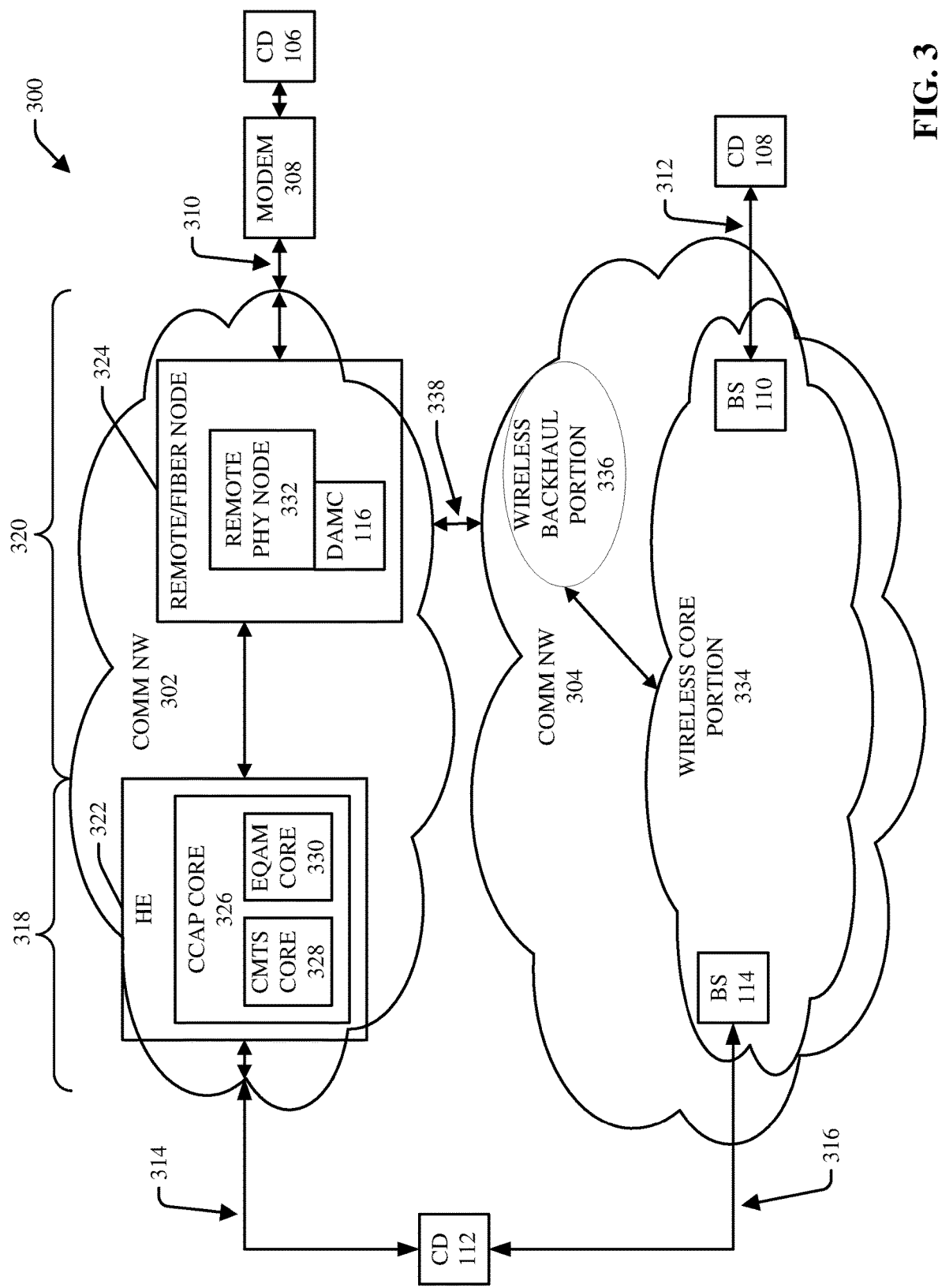
FIG. 3 illustrates a block diagram of another example system that can manage distribution access channels among and across multiple communication networks, in accordance with various aspects and embodiments of the disclosed subject matter.

Referring to FIG. 3 (along with FIGS. 1 and 2), FIG. 3 illustrates a block diagram of another example system 300 that can manage distribution access channels among and across multiple communication networks, in accordance with various aspects and embodiments of the disclosed subject matter. The system 300 can comprise a first communication network 302 and a second communication network 304. In some embodiments, the first communication network 302 (COMM NW 302) can be or can comprise a cable communication network, and the second communication network 304 (COMM NW 304) can be or can comprise a wireless communication network.

The communication device (CD) 106 can be associated with (e.g., communicatively connected to) the first communication network 302. The communication device 108 can be associated with the second communication network 304. The communication device 112 can be associated with the first communication network 302 and/or the second communication network 304.

In some embodiments, the communication device 106 can be associated with (e.g., communicatively connected to) the first communication network 302 via a wired communication connection. For instance, the communication device 106 can be connected to a modem 308 (e.g., cable modem), and the modem 308 can be connected to the first communication network 302 via the wired communication connection 310 (e.g., a coaxial cable connection). The communication device 108 can be associated with (e.g., communicatively connected to) the base station (BS) 110 of the second communication network 304 via a wireless communication connection 312. In some embodiments, the communication device 112 can be associated with (e.g., communicatively connected to) the first communication network 302 via a wired communication connection 314 (e.g., the communication device 112 can be connected to a modem, which can be connected to the first communication network 302 via a coaxial cable, or the communication device 112 can be otherwise connected to the first communication network 302 via a wired communication connection). In certain embodiments, the communication device 112 can be associated with (e.g., communicatively connected to) the base station 114 of the second communication network 304 via a wireless communication connection 316.

With further regard to the first communication network 302, the first communication network 302 can comprise a wired core portion 318 and a wired backhaul portion 320. The wired core portion 318 can comprise a cable head end (HE) component 322 (HE 322), and the wired backhaul portion 320 can comprise a remote/fiber node 324. The cable HE component 322 can receive communication signals, comprising content (e.g., video content, audio content, or textual content), from data sources (e.g., data source devices) for processing and distribution of the content to communication devices (e.g., communication device 106) associated with the first communication network 302.

The cable HE component 322 can be connected to the remote/fiber node 324, wherein the cable HE component 322 can receive data (e.g., upstream data communication signals) from the remote/fiber node 324, can communicate data (e.g., downstream data communication signals), including content (e.g., video, audio, or textual content), to the remote/fiber node 324. In some embodiments, the cable HE component 322 and the remote/fiber node 324 can communicate with each other via a wired communication link, such as an Ethernet link (e.g., Layer 2 (L2) Ethernet link) or other type of communication link. In certain embodiments, the cable HE component 322 and the remote/fiber node 324 can be connected to each other via fiber (e.g., fiber-optic) connections, wherein the communication signals can be or can comprise optical communication signals. In some embodiments, to facilitate the communication of data between the cable HE component 322 and the remote/fiber node 324 via the communication link, the cable HE component 322 and/or the remote/fiber node 324 can establish desired communication channels or tunnels via which data can be communicated. In certain embodiments, the cable HE component 322 and/or the remote/fiber node 324 can establish desired communication tunnels, such as L2 tunnelling protocol version 3 (L2TPv3) tunnels, in accordance with the L2TPv3 (or other desired tunnelling protocol) via which data can be communicated between the cable HE component 322 and/or the remote/fiber node 324.

The cable HE component 322 can comprise a converged cable access platform (CCAP) core component 326. The CCAP core component 326 can comprise a cable modem termination system (CMTS) core component 328 that can provide or facilitate providing IP-based connectivity (e.g., Internet connectivity) at a desirably high speed via the first communication network 302 (e.g., the HFC communication network of the first communication network 302). In some embodiments, the CMTS core component 328 can provide or facilitate providing a media access control (MAC) and/or PHY layer connection to a modem (e.g., cable modem 308)

associated with a communication device (e.g., communication device 106) and associated user (e.g., cable subscriber or other service subscriber). The PHY layer can, for example, connect or facilitate connecting the MAC layer to an optical fiber cable or other connective cable (e.g., copper cable or other communication and/or conductive cable that can provide connectivity and data communication capabilities). The CMTS core component 328 can comprise a receiver(s) (e.g., upstream receiver) and transmitter(s) (e.g., downstream transmitter), a processor(s) and/or processing functionality, data communication functionality (e.g., IP-based processing and protocols), scheduling functionality, data security functionality, QoS functionality, and/or other desired functionality.

The CCAP core component 326 also can include an edge quadrature amplitude modulation (EQAM) core component 330 that can facilitate the provision of various services, including video services, such video streaming, video on demand (VOD), and/or other types of video services, to communication devices (e.g., communication device 106) of users. In some embodiments, the EQAM core component 330 can receive an IP-based unicast or multicast stream (e.g., video, audio, or multimedia stream) of data packets (e.g., from communication device 112 or other data source device), and can generate a transport stream of data (e.g., video, audio, or multimedia stream) in a desired format for transmission via the transmission carriers of the first communication network 302. The EQAM core component 330 can support or provide a single video and/or program transport stream, and/or multiple video and/or program transport streams to communication devices (e.g., communication device 106).

With further regard to the remote/fiber node 324, in some embodiments, the remote/fiber node 324 can be or can comprise an HFC optical node. The remote/fiber node 324 can be associated with (e.g., communicatively connected to) the cable HE component 322. The remote/fiber node 324 can receive optical communication signals from the cable HE component 322, and can, for example, convert the optical or digital communication signals (e.g., optical or digital data signals) to electrical communication signals (e.g., electrical data signals) that can be communicated via coaxial cable to communication devices, such as communication device 106. The remote/fiber node 324 also can receive electrical communication signals from communication devices (e.g., communication device 106) and can convert those electrical communication signals to optical or digital communication signals that can be communicated to the cable HE component 322 for further processing or communication.

The remote/fiber node 324 can comprise a remote PHY node 332 (e.g., remote PHY device or component). In some embodiments, the remote PHY node 332 can comprise various CCAP functionalities. The remote PHY node 332 also can comprise PHY-related circuitry, quadrature amplitude modulation (QAM) functionality (e.g., QAM modulators and demodulators), and/or other desired functionality. The remote PHY node 332 can be connected to the CCAP core component 326 to facilitate communication of data (e.g., video data or other data) from the CCAP core component 326 to communication devices (e.g., communication device 106) and from communication device to the CCAP core component 326. The remote PHY node 332 can convert or facilitate the conversion of digital data to analog or optical data, conversion of analog data to digital or optical data, and/or conversion of optical data to digital or analog data.

With further regard to the second communication network 304, the second communication network 304 can be or can comprise a mobility core network (e.g., a wireless communication network). In some embodiments, the second communication network 304 can comprise a wireless core portion 334 and a wireless backhaul portion 336. The second communication network 304 (e.g., LTE, 5G, or other next generation (e.g., xG) core network) can operate to enable wireless communication between communication devices (e.g., communication device 108) and/or between a communication device and the second communication network 304 or another communication network (e.g., the first communication network 302) associated with the second communication network 304. The second communication network 304 can comprise various components, such as network (NW) nodes, e.g., radio network nodes) that can be part of the second communication network 304 to facilitate communication of information between devices (e.g., communication devices) that can be associated with (e.g., communicatively connected to) the second communication network 304 or another communication network (e.g., the first communication network 302) associated with the second communication network 304. In some embodiments, the second communication network 304 can employ MIMO technology to facilitate data communications between devices (e.g., network devices, communication devices, or other devices) associated with the second communication network 304.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can comprise, or can be associated with (e.g., communicatively connected to) a network device of the second communication network 304.

At given times, one or more communication devices, such as, for example, communication device 106 and/or communication device 112 can attach or connect, or attempt to attach or connect, to the second communication network 304 to communicate with other communication devices associated with the second communication network 304 or another communication network (e.g., the first communication network 302) associated with the second communication network 304. A communication device (e.g., 106 or 112) also can be referred to as, for example, a device, a mobile device, or a mobile communication device. The term communication device can be interchangeable with (or include) a UE or other terminology.

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data traffic and voice traffic can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, the second communication network 304 can comprise various network components or devices, which can include one or more RANs (not explicitly shown in FIG. 1), wherein each RAN can comprise or be associated with a set of base stations (e.g., access points (APs)), such as base station 110 and base station 114, that can serve communication devices (e.g., communication device 108 or communication device 112) located in respective coverage areas served by respective base stations in the second communication network 304. The respective base stations (e.g., 110 and/or 114) can be associated with one or more sectors (not shown), wherein respective sectors can comprise respective cells. The cells can have respective coverage areas that can form the coverage area covered by the one or more sectors. The respective communication devices can be communicatively connected to the second communication network 304 via respective wireless communication connections with one or more of the respective cells.

In some embodiments, the one or more RANs can be based on open-RAN (O-RAN) technology and standards. These standards can define the open interface that can support interoperability of network elements (e.g., radio unit (RU), central unit (CU), distributed unit (DU), real or near real time RAN intelligent controller (RIC), or other type of network element) from different entities (e.g., vendors). The network elements may be virtualized, e.g., software-based components that can run on a common virtualization/cloud platform. In certain embodiments, the O-RAN based RAN can utilize a common platform that can reduce reliance on proprietary platforms of service providers. The O-RAN based RAN also can employ standardized interfaces and application programming interfaces (APIs) to facilitate open source implementation of the O-RAN based RAN.

In accordance with various embodiments, the system 300 can comprise the DAMC 116 that can desirably (e.g., suitably, efficiently, enhancedly, or optimally) manage communication channels (e.g., distribution access channels) and the communication of data among or across multiple communication networks (e.g., the first communication network 302 and the second communication network 304), in accordance with the defined communication management criteria and a corresponding policy, such as described herein. In some embodiments, the DAMC 116 can be part of the first communication network 302 (e.g., the remote/fiber node 324 of the first communication network 302), as depicted in FIG. 3, although in other embodiments, the DAMC 116 can be located in the second communication network 304 or can be external to, and communicatively connected to, the first communication network 302 and second communication network 304, such as described herein.

In certain embodiments, the wired backhaul portion 320 of the first communication network 302 can be connected, by a connector component 338 (e.g., connector component comprising fiber optic cables or other type of cables or connectors that can be used to communicate data), to the wireless backhaul portion 336 of the second communication network 304. The connector component 338 can be utilized to communicate data between the first communication network 302 and second communication network 304. For example, the connector component 338 can be utilized as part of an alternate communication path (e.g., a portion of an alternate communication channel) to re-route data between the first communication network 302 and second communication network 304 in response to, and to mitigate, a problem (e.g., failure, malfunction, or impairment) of a communication channel (e.g., wired communication channel) associated with the first communication network 302 or a communication channel (e.g., wireless communication channel) associated with the second communication network 304, in accordance with the defined communication management criteria. In some embodiments, the DAMC 116, employing the connector component 338, can establish or generate or facilitate establishing or generating quantum connections between the first communication network 302 and second communication network 304.

The disclosed subject matter can thus employ smart HFC by leveraging the DAMC 116, comprising an IP and quantum enabled intelligent module (QIM), located in the HFC optical node (e.g., the remote/fiber node 324) (or other desired location of the system 300), employing digital link with the cable HE component 322. The desirable features of the disclosed subject matter comprise quantum enabled intelligent treatment for desired (e.g., selected, suitable, or wanted) data traffic, such as, for example mission critical data traffic, other data traffic having desirably high priority, importance, or criticality, high QoS data traffic, or other desired data traffic, in accordance with the defined communication management criteria and corresponding policy. The DAMC 116 and the techniques for managing communication channels and communication (e.g., including re-routing) of data, such as described herein, can ride on and leverage cable multiple system operators (MSOs) CCAP evolution of deep fiber and digital link HFC strategies that can pave the way for all-IP, or virtually all-IP, from the cable HE component 322 to the HFC optical node (e.g., the remote/fiber node 324).

In some embodiments, the remote PHY node 332 can utilize this IP-based digital (forward/reverse) link as well. This can be the digital link between the cable HE component 322 and the HFC optical node (e.g., the remote/fiber node 324) that can provide a local IP point of presence (POP) in the HFC optical node where the DAMC 116 (e.g., comprising the QIM) resides. The DAMC 116 situated in a digital link enabled optical node (e.g., the remote/fiber node 324) can leverage the native IP POP to provide desirably advanced features, such as, for example, QoS, disaster recovery and cable and wireless backhaul sharing, and other desirable features, such as, for example, quantum networking services, including desirably fast and secured (e.g., desirably protected and encrypted) transport of data. The DAMC 116, employing QIM, can have a view of deep fiber-based accesses health statistics (e.g., communication quality, communication conditions, or other health statistics) of desired (e.g., selected or wanted) data traffics/IP packets and can comprise functionalities of quantum networking, data traffic discrimination, route selection for routing of data traffic, QoS, disaster recovery, and other desired functionalities, such as described herein.

Since quantum networking can be relatively costly and non-ubiquitous, the QIM of the DAMC 116 can serve as a regional intelligent hub for a desired (e.g., selected, suitable, or wanted) set of services defined by the desired policy (e.g., including business or other policies). The DAMC 116, employing the QIM, can perform desired quantum enabled network maintenance, including the desirable re-routing of data traffic from one communication channel to another communication channel in response to a problem with the communication channel. As an example, with regard to a single common video (e.g., streamed or stored) source (e.g., a data source device, such as communication device 112) that can have multiple distribution accesses (e.g., via the first communication network 302 and second communication network 304), if for any reason there is a failure in the wireline (e.g., cable) core (e.g., the wired core portion 318) of the first communication network 302 or the wireless core portion 334 of the second communication network 304, the DAMC 116 can detect such failure and can make a policy-based decision to determine whether to re-route the data (e.g., video data), and if so, to route the data over a desirably secure and healthy core (e.g., the other of the wired core portion 318 or the wireless core portion 334). As the quantum interface can be relatively costly and non-ubiquitous, the DAMC 116, employing the QIM, can have the functionality of setting up a quantum link with any node or destination point in the first communication network 302 (e.g., wired communication network) or second communication network 304 (e.g., wireless communication network) on demand. This can desirably benefit densification of wireless as well as cable deep fiber technology-based advanced and secured HFC services.

The DAMC 116 and the techniques for managing communication channels and communication (e.g., including re-routing) of data, such as described herein, by enhancing and extending quantum, IP, and Ethernet to the fiber network (e.g., optical fiber network) with digital optics, services delivered for both residential and business customer data traffic can share the same quantum intelligent node, by multiplexing at the wavelength, Ethernet, multiprotocol label switching (MPLS), or IP layers. Similarly, QIM can be leveraged for the QoS of a desirably diverse discriminated set of services in an integrated wireless and wired (e.g., cable) access loop. In accordance with various embodiments, the implementation can of QIM can be different (e.g., tailored or customized) for different information technology (IT) service providers, as desired.

In accordance with various embodiments, the DAMC 116 can receive (e.g., periodically, aperiodically, dynamically, regularly, or constantly receive) desired telemetry, health statistics (e.g., communication conditions statistics) from various components and devices of or associated with the communication networks (e.g., 302, 304), including the cable HE component 322, HFC node (e.g., remote/fiber node 324), wireless core portion 334, wireless backhaul portion 336, and desired communication devices (e.g., communication device 112 or other data source devices). The monitor component 204 of the DAMC 116 can monitor communication conditions associated with communication channels (e.g., distribution access channels) associated with or across the communication networks (e.g., first communication network 302 and second communication network 304). For example, during a data session between the communication device 112 (e.g., data source device) and the communication device 106 via a first communication channel associated with the first communication network 302, the monitor component 204 can monitor communication conditions (e.g., data communication rate, data throughput, QoS, SINR, or other communication conditions) associated with the first communication channel during the data session. Based at least in part on the monitoring, the DAMC 116 can receive communication conditions data relating to the communication conditions from the various components and devices of or associated with the communication networks (e.g., 302, 304), including the cable HE component 322, remote/fiber node 324, wireless core portion 334, wireless backhaul portion 336, desired communication devices (e.g., communication device 112 or other data source devices), and/or other components or devices.

The analyzer component 206 can analyze the communication conditions data associated with communication channels, network components, and/or communication devices to facilitate detecting any problems that may occur with communication channels. For example, with regard to the example data session associated with communication device 106 and communication device 112, the analyzer component 206 can analyze communication conditions data associated with the first communication channel associated with the first communication network 302 to facilitate determining whether there is any problem (e.g., failure, malfunction, or impairment) associated with the first communication channel and the communication of data traffic (e.g., video stream or other data) via the first communication channel.

The detector component 208 of the DAMC 116 can determine or detect whether a communication channel associated with a communication network (e.g., first communication network 302 or second communication network 304) is experiencing a problem (e.g., failure, malfunction, or impairment) in connection with the communication of data traffic between communication devices via the communication channel, based at least in part on the results of an analysis of communication conditions data associated with the communication channel. For instance, with regard to the example data session, based at least in part on the results of the analysis of the communication conditions data associated with the first communication channel, the detector component 208 can determine or detect whether the first communication channel is experiencing a problem in connection with the communication of data traffic between the communication device 112 and communication device 106 via the first communication channel.

If, based at least in part on the results of the analysis of the communication conditions data, the detector component 208 does not detect a problem with a communication channel (e.g., first communication channel), the monitor component 204 can continue to monitor communication conditions associated with the communication channel and associated components and devices. If, instead, based at least in part on the results of the analysis of the communication conditions data, the detector component 208 determines that there is a problem associated with the first communication channel (e.g., a problem that may make re-routing of the data traffic to a second communication channel desirable), the router component 210 of the DAMC 116 can determine whether data traffic of the data session associated with the communication devices (e.g., 106, 112)

is to be re-routed from the first communication channel associated with the first communication network 302 to a second communication channel associated with (e.g., at least partially associated with) the second communication network 304, based at least in part on the policy (and associated communication management criteria), to facilitate bypassing the portion of the first communication channel and/or the first communication network 302 that is experiencing the problem. The policy (and associated communication management criteria) can indicate or specify the conditions under which re-routing of data traffic to another communication channel associated with another communication network is to be or can be performed (e.g., is permitted or authorized to be performed), such as described herein. The policy can be specified or structured based at least in part on a preference of an entity (e.g., communication network provider, service provider, or other entity), and can be structured to desirably balance the costs of re-routing data traffic from one communication channel associated with one communication network to another communication channel associated with (e.g., at least partially routed through) another communication network in relation to the desire (e.g., want, need, or requirement) for the data traffic to be communicated via a communication channel (e.g., to a desired destination communication device), wherein the type of data traffic, type of application or service associated with the data traffic, QoS, and/or the importance, criticality, or priority level associated with the data traffic can be indicative of how high the desire is for the data traffic to be communicated via a communication channel. The data traffic re-routing policies in the policy can be different based at least in part on the respective types of data traffic, respective types of services associated with respective data traffic, the respective importance, criticality, or priority levels associated with the respective data traffic, and/or preferences of an entity.

The router component 210 (e.g., in conjunction with the analyzer component 206) can analyze the policy information of the policy to determine which data traffic re-routing policy to apply to the data traffic for the data session under consideration. If the results of analyzing policy information of the policy indicates that re-routing of the data traffic associated with the data source device and communication device is not to be performed, the router component 210 can determine that the data traffic of the data session involving the communication device 106 and communication device 112 is not to be re-routed (e.g., the communication of data traffic via the first communication channel can be interrupted or otherwise impaired, instead of re-routing the data traffic of the data session through another communication channel), such as described herein.

If, instead, the results of analyzing the policy information of the policy indicates that re-routing of the data traffic of the data session involving the communication device 106 and communication device 112 is to be or can be performed, the router component 210 can facilitate establishing a second communication channel associated with the second communication network 304, wherein the second communication channel can be between the communication device 106 and communication device 112, and can be at least partially routed through the second communication network 304 to facilitate bypassing the portion of the first communication network 302, including the portion of the first communication channel, that is experiencing the problem. In some embodiments, the router component 210 can determine, establish or facilitate establishing, or generate or facilitate generating a second communication channel associated with the second communication network 304 that can be utilized to communicate the data traffic of the data session based at least in part on routing-related information (e.g., routing-related information in a routing table, such as a local logic table) that can indicate or specify an alternate communication path(s) to the data source (e.g., communication device 112) and/or the data destination (e.g., communication device 106). The routing-related information also can indicate nodes, components, or devices of or associated with the second communication network 304 or first communication network 302 that can be utilized, instantiated, or created to facilitate the re-routing of the data traffic. In certain embodiments, the DAMC 116 (e.g., the QIM of the DAMC 116) can maintain logical connections over all IP with all of the components in access and the core network management nodes the DAMC 116 supports. This can enable the DAMC 116 to desirably (e.g., suitably, enhancedly, efficiently, or optimally) establish determine, establish or facilitate establishing, or generate or facilitate generating an alternate communication channel (e.g., the second communication channel) associated with an alternate communication network (e.g., the second communication network 304) that can be utilized to re-route and communicate data traffic of a data session.

As an example of establishing an alternate (e.g., second) communication channel, the router component 210 can facilitate establishing or generating the second communication channel such that the second communication channel can follow an alternate communication path that can extend from the data source (e.g., communication device 112) through the wireless core portion 334 of the second communication network 304 to the wireless backhaul portion 336 of the second communication network 304, bypassing the portion (e.g., node(s)) of or associated with the first communication network 302 (e.g., in the cable HE component 322 or other part of the wired core portion 318 of the first communication network 302, or otherwise associated with the data source and first communication network 302) that is experiencing the problem by proceeding through the second communication network 304 (e.g., proceeding through the wireless core portion 334 of the second communication network 304 to the wireless backhaul portion 336 of the second communication network 304), wherein, via the connector component 338, the second communication network 304, and associated second communication channel, can be associated with (e.g., communicatively connected to) the wired backhaul portion 320 of the first communication network 302 that is determined to be operating in a desirable (e.g., acceptable, suitable, or optimal) manner, and the second communication channel can proceed through the wired backhaul portion 320 of the first communication network 302 to the communication device 106 associated with the first communication network 302. The second communication channel and/or the connector component 338 can comprise a quantum connection or other desired type of communication connection. The data traffic (e.g., a second portion of the data traffic) of the data session involving the communication device 112 and communication device 106 can be re-routed via the second communication channel, for example, until the problem associated with the first communication channel is remedied (e.g., corrected, repaired, rectified, or mitigated) or until the data session is completed (e.g., terminated).

In certain embodiments, the second communication channel, or a desired portion thereof, can comprise a quantum connection and/or quantum nodes or other quantum networking components. To facilitate establishing (e.g., setting up) the quantum connection, the DAMC 116 (e.g., the router component 210 or other component of the DAMC 116) can instantiate or generate a virtual instance for a quantum node (e.g., associated with the second communication network 304) that can be utilized to facilitate establishing, generating, or maintaining the quantum connection and associated second communication channel.

In connection with establishing the second communication channel and re-routing of the data traffic of the data session via the second communication channel, the notification component 214 can generate notification or instruction messages, wherein the notification component 214 (e.g., in conjunction with the communicator component 202) can communicate the notification or instruction messages to desired network components associated with the communication networks (e.g., 302, 304) and/or communication devices (e.g., communication device 112) to notify or instruct (e.g., command) the desired network components and/or communication devices that the data traffic of the data session is being re-routed from the first communication channel associated with the first communication network 302 to the second communication channel associated with (e.g., partially routed through) the second communication network 304 and part of (e.g., the wired backhaul portion 320 of) the first communication network 302. The notification component 214 (e.g., via the messages) also can notify desired network components (e.g., network component of any northbound central monitoring system) associated with the communication networks (e.g., 302, 304) that there is a problem associated with the first communication channel.

The monitor component 204 can continue to monitor communication channels, including the first communication channel and the second communication channel, associated with the communication networks (e.g., 302, 304). With regard to the first communication channel, if, based on the results of the analysis of communication conditions data (e.g., subsequent communication conditions data) relating to communication conditions associated with the first communication channel, the detector component 208 determines that the problem associated with the first communication channel has been remedied, the router component 210 can facilitate re-routing the data traffic (e.g., a third portion of the data traffic) of the data session involving the communication device 106 via the first communication channel established (e.g., re-established) between the communication device 112 and communication device 106 (or via an established communication channel associated with the first communication network 302 that can correspond to the first communication channel). For instance, the router component 210 (e.g., in conjunction with the notification component 214) can instruct (e.g., via notification or instruction messages) desired network components and/or communication devices to re-route the data traffic (e.g., a third portion of the data traffic) of the data session involving the communication device 112 and communication device 106 via the first communication channel (or other corresponding communication channel associated with the first communication network 302) established (e.g., re-established) between the communication device 112 and communication device 106. The data traffic can be communicated, via the re-established first communication channel (or the established communication channel corresponding thereto) through the wired core portion 318, including the cable HE component 322, through the remote/fiber node 324, including the remote PHY node 332, through the wired communication connection 310 (e.g., coaxial cable), and through the modem 308 to the communication device 106.

It is to be appreciated and understood that, while the system 300 depicts the connector component 338 extending between the wired backhaul portion 320 of the first communication network 302 and the wireless backhaul portion 336 of the second communication network 304, alternatively or additionally, the connector component 338 or another connector component(s) can extend from the wired backhaul portion 320 or another portion of the first communication network 302 to another portion of the second communication network 304 (or to the wireless backhaul portion 336 of the second communication network 304) to facilitate establishing alternate communicate channels for re-routing and communication of data traffic to facilitate bypassing a problem area of a communication network.

In some embodiments, in a manner similar to the example re-routing of data traffic of the data session involving the communication device 106 and communication device 112, the DAMC 116 can re-route, or at least determine whether to re-route, data traffic of a data session involving the communication device 108 (e.g., wireless or cellular communication device) and the communication device 112, in accordance with the policy (and associated communication management criteria). For instance, the monitor component 204 can monitor communication conditions associated with a communication channel (e.g., a different second communication channel) associated with the second communication network 304 and between the communication device 108 and communication device 112 (wherein this communication channel can be a different second communication channel (and different communication path) than the second communication channel described above with regard to the data session involving the communication device 106 and communication device 112).

If, based at least in part on the results of an analysis (e.g., by the analyzer component 206) of the communication conditions data relating to the communication channel, the detector component 208 detects a problem with the communication channel, the router component 210 can determine whether to re-route the data traffic from the communication channel associated with the second communication network 304 to another communication channel associated with the first communication network 302 (e.g., another communication channel that can be at least partially routed through the first communication network 302, such as the wired core portion 318 and/or wired backhaul portion 320 of the first communication network 302) based at least in part on the results of an analysis of the policy, in accordance with the defined communication management criteria. If the router component 210 determines that such data traffic is to be re-routed to the other communication channel, the router component 210 can facilitate establishing the other communication channel associated with (e.g., partially associated with) the first communication network 302, including the portion of such other communication channel that can extend through the connector component 338 from the first communication network 302 (e.g., the wired backhaul portion 320 of the first communication network 302) to the second communication network 304 (e.g., the wireless backhaul portion 336 of the second communication network 304), and can instruct (e.g., via messages from the notification component 214) desired network components and/or communication devices to re-route the data traffic from the communication channel associated with the second communication network 304 to the other communication channel associated with the first communication network 302 (and partially routed through a desirably operational portion (e.g., wireless backhaul portion 336) of the second communication network 304 associated with the communication device 108) to facilitate desirably routing the data traffic between the communication device 112 and communication device 108.

The monitor component 204 can continue to monitor communication channels, including the communication channel associated with the second communication network 304. If, based on the results of the analysis of communication conditions data (e.g., subsequent communication conditions data) relating to communication conditions associated with the communication channel, the detector component 208 determines that the problem associated with the communication channel has been remedied, the router component 210 can facilitate re-routing the data traffic (e.g., another portion of the data traffic) of the data session involving the communication device 112 and communication device 108 via the original communication channel (or other corresponding communication channel associated with the second communication network 304) established (e.g., re-established) between the communication device 112 and communication device 108, and the data traffic can again be routed from the communication device 112 to the base station 114 and through the wireless core portion 334 and wireless backhaul portion 336 of the second communication network 304, and from the base station 110 to the communication device 108.

With further regard to the DAMC 116, the DAMC 116 can comprise or be associated with the AI component 216. In accordance with various embodiments, the AI component 216 can perform an AI and/or machine learning (ML) analysis on data comprising or relating to users (e.g., user preferences of users associated with communication devices or communication networks), communication devices, data traffic associated with data sessions involving communication devices (e.g., 106, 108, or 112), communication conditions associated with communication channels, network components, or communication devices (which also can include various communication network conditions (e.g., network congestion, network resource availability, or other communication network conditions associated with the communication networks 302 and 304), applications, services, communication device location data, metadata, historical information relating thereto, or other desired types of information.

In some embodiments, in connection with or as part of such an AI or ML analysis, the AI component 216 can employ, build (e.g., construct or create), and/or import, AI and/or ML techniques and algorithms, AI and/or ML models, neural networks (e.g., neural networks trained using the AI component 216), and/or graph mining to render and/or generate predictions, inferences, calculations, prognostications, estimates, derivations, forecasts, detections, and/or computations that can facilitate determining whether data traffic associated with a data session between communication devices is to be re-routed from one communication channel associated with a communication network to another communication channel associated with (e.g., at least partially routed through) another communication network; a data traffic type of data traffic associated with a data session associated with a communication device(s); a service or application type of a service or application being utilized during the data session; a characteristic value associated with a characteristic (e.g., communication rate, QoS level, data throughput level, priority, importance, or criticality level, or other type of characteristic value associated with a characteristic associated with the data session); a type of problem associated with a communication channel; a location (e.g., location within or associated with a communication network) of the problem with the communication channel; a source (e.g., node(s), device, or other source) of the problem associated with the communication channel; whether to adapt (e.g., modify, adjust, or change) a condition of the policy relating conditions under which data traffic can be re-rerouted; a defined threshold characteristic value associated with a characteristic (e.g., defined threshold communication rate, defined threshold QoS level, defined threshold data throughput level, defined threshold priority, importance, or criticality level, or other defined threshold characteristic value) to utilize to facilitate determining whether to re-route the data traffic associated with the data session; whether to adapt a defined threshold characteristic value to a different threshold characteristic value (e.g., with regard to a user (e.g., on a per user basis), communication device (e.g., on a per communication device basis), or a subscription or an account associated with a user or communication device); and/or facilitate making other desired determinations, such as the determinations described herein; and/or facilitating automating one or more functions or features of the disclosed subject matter (e.g., automating one or more functions or features of or associated with the DAMC 116, the communication networks, a communication device, or other device or component), as more fully described herein.

As an example, based at least in part on the results of an AI or ML analysis performed on the data, the AI component 216 can learn, infer, or determine a priority, importance, or criticality level of data traffic associated with a data session between communication devices to facilitate determining whether the data traffic is to be re-routed from one communication channel associated with a communication network to another communication channel associated with (e.g., at least partially routed through) another communication network due to a problem associated with communication the data traffic via the communication channel. As another example, based at least in part on the results of an AI or ML analysis performed on the data, the AI component 216 can learn, infer, or determine a data traffic type of data traffic associated with a data session between communication devices and/or a service or application type of the service or application being utilized during the data session to facilitate learning, inferring, or determining the priority, importance, or criticality level of the data traffic associated with the data session. From such learning, inferences, or determinations, the DAMC 116 can determine whether the data traffic is to be re-routed from one communication channel associated with a communication network to another communication channel associated with another communication network due to a problem associated with communication the data traffic via the communication channel, in accordance with the policy (and corresponding communication management criteria).

The AI component 216 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 216 can examine the entirety or a subset of the data (e.g., data associated with data sessions, communication devices, or users; or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

In some embodiments, the DAMC 116 can comprise the operations manager component 218, which can control (e.g., manage) operations associated with the DAMC 116. For example, the operations manager component 218 can facilitate generating instructions to have components of the DAMC 116 perform operations, and can communicate respective instructions to respective components (e.g., communicator component 202, monitor component 204, analyzer component 206, detector component 208, router component 210, policy component 212, notification component 214, AI component 216, processor component 220, and data store 222) of the DAMC 116 to facilitate performance of operations by the respective components of the DAMC 116 based at least in part on the instructions, in accordance with the defined communication management criteria and communication management algorithms or other algorithms (e.g., communication management algorithms, AI or machine learning algorithms, or other algorithms, as disclosed, defined, recited, or indicated herein by the methods, systems, and techniques described herein). The operations manager component 218 also can facilitate controlling data flow between the respective components of the DAMC 116 and controlling data flow between the DAMC 116 and another component(s) or device(s) (e.g., a base station or other network component, node, equipment, or device of a communication network, a communication device, data sources, applications, or other type of component or device) associated with (e.g., connected to) the DAMC 116.

In certain embodiments, the DAMC 116 can comprise or be associated with the processor component 220. The processor component 220 can work in conjunction with the other components (e.g., communicator component 202, monitor component 204, analyzer component 206, detector component 208, router component 210, policy component 212, notification component 214, AI component 216, processor component 220, and data store 222) to facilitate performing the various functions of the DAMC 116. The processor component 220 can employ one or more processors, microprocessors, or controllers that can process data, such as information relating to communication networks, communication devices, users, user preferences of users, characteristics (e.g., communication rates, data throughput, QoS levels, or other characteristic) associated with communication devices, communication channels, or communication networks, communication conditions associated with communication devices, communication channels, or communication networks, network configuration of the communication network, quantum connections, quantum nodes, quantum networks, threshold values (e.g., defined threshold characteristic values, defined threshold communication rate, defined threshold QoS level, or other threshold value), routing or re-routing of data traffic, device identifiers associated with communication devices, authentication credentials associated with communication devices or users, metadata, parameters, traffic flows, policies, defined communication management criteria, algorithms (e.g., communication management algorithms, AI or machine learning algorithms, or other algorithms, as disclosed, defined, recited, or indicated herein by the methods, systems, and techniques described herein), protocols, interfaces, tools, and/or other information, to facilitate operation of the DAMC 116, as more fully disclosed herein, and control data flow between the DAMC 116 and other components (e.g., a base station or other network component, node, equipment, or device of a communication network, a communication device, data sources, applications, or other type of component or device) associated with the DAMC 116.

The data store 222 can store data structures (e.g., user data, metadata), code structure(s) (e.g., modules, objects, hashes, classes, procedures) or instructions, information relating to communication networks, communication devices, users, user preferences of users, characteristics (e.g., communication rates, data throughput, QoS levels, or other characteristic) associated with communication devices, communication channels, or communication networks, communication conditions associated with communication devices, communication channels, or communication networks, network configuration of the communication network, quantum connections, quantum nodes, quantum networks, threshold values (e.g., defined threshold characteristic values, defined threshold communication rate, defined threshold QoS level, or other threshold value), routing or re-routing of data traffic, device identifiers associated with communication devices, authentication credentials associated with communication devices or users, metadata, parameters, traffic flows, policies, defined communication management criteria, algorithms (e.g., communication management algorithms, AI or machine learning algorithms, or other algorithms, as disclosed, defined, recited, or indicated herein by the methods, systems, and techniques described herein), protocols, interfaces, tools, and/or other information, to facilitate controlling operations associated with the DAMC 116. In an aspect, the processor component 220 can be functionally coupled (e.g., through a memory bus) to the data store 222 in order to store and retrieve information desired to operate and/or confer functionality, at least in part, to the communicator component 202, monitor component 204, analyzer component 206, detector component 208, router component 210, policy component 212, notification component 214, AI component 216, processor component 220, and data store 222 or other component, and/or substantially any other operational aspects of the DAMC 116.

The disclosed subject matter, by employing the DAMC 116 (including the QIM) and the techniques relating to determinations that relate to re-routing of data traffic, such as described herein, can enhance (e.g., improve, increase, or optimize) the performance of communication networks, can enhance the provision of services and content (e.g., video streaming, mission critical or other high priority content, or other desired content), can bring about desirable operations consolidation between content sources for enhanced efficiency, can enhance 5G (and other xG) and HFC interaction with network management for enhanced QoS associated with data communications, can enhance revenues of network providers/operators, service providers, and other entities, can provide enhanced and/or new enables for cellular densification and access management, can enable desirable integrated access infrastructure associated with communication networks, and/or can provide other desirable benefits.

It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

Described herein are systems, methods, articles of manufacture, and other embodiments or implementations that can facilitate detecting and mitigating aggressive and/or malicious communication devices, and associated aggressive and/or malicious events, against a RAN of a communication network, and managing attachment, registration, or connection of communication devices to the RAN or communication network, as more fully described herein. The detecting and mitigating of aggressive and/or malicious communication devices, and associated aggressive and/or malicious events against a RAN and/or communication network, managing of attachment, registration, or connection of communication devices to the RAN or communication network, and/or other features of the disclosed subject matter, can be implemented in connection with any type of device with a connection to, or attempting to connect to, the communication network (e.g., a wireless or mobile device, a computer, a handheld device, or other device), any Internet of things (IoT) device (e.g., health monitoring device, toaster, coffee maker, blinds, music players, speakers, or other IoT device), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, or other type of device. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/ or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) or any other type of radio network node.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 4:
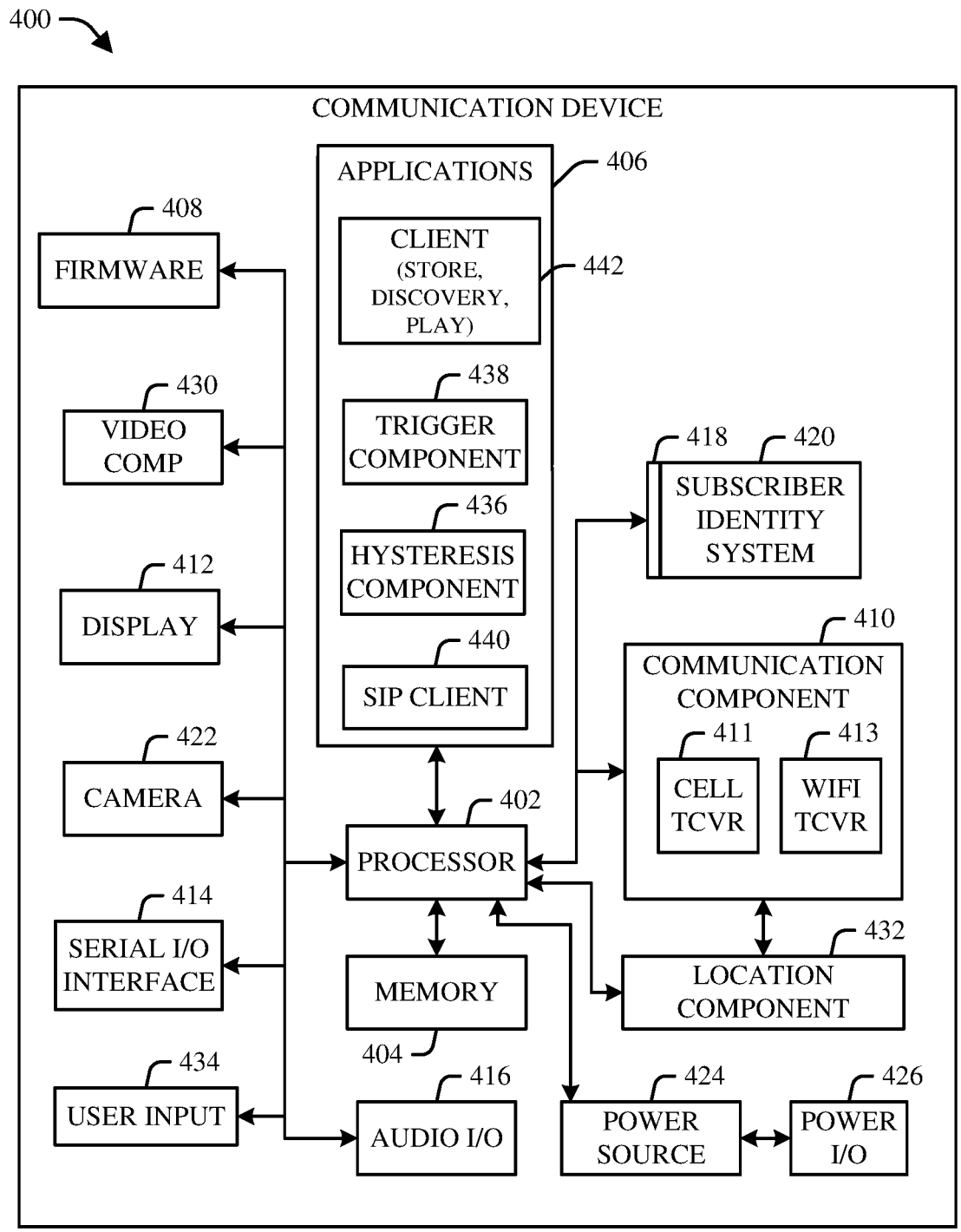
FIG. 4 depicts a block diagram of example communication device, in accordance with various aspects and embodiments of the disclosed subject matter.

Referring now to FIG. 4, depicted is an example block diagram of an example communication device 400 (e.g., wireless or mobile phone, electronic pad or tablet, electronic eyewear, electronic watch, or other electronic bodywear, IoT device, or other type of communication device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 400 can include a processor 402 for controlling and processing all onboard operations and functions. A memory 404 interfaces to the processor 402 for storage of data and one or more applications 406 (e.g., a video player software, user feedback component software, or other type of application). Other applications can include voice recognition of predetermined voice commands that facilitate initiation of the user feedback signals. The applications 406 can be stored in the memory 404 and/or in a firmware 408, and executed by the processor 402 from either or both the memory 404 or/and the firmware 408. The firmware 408 can also store startup code for execution in initializing the communication device 400. A communication component 410 interfaces to the processor 402 to facilitate wired/wireless communication with external systems, e.g., cellular networks, VoIP networks, and so on. Here, the communication component 410 can also include a suitable cellular transceiver 411 (e.g., a GSM transceiver) and/or an unlicensed transceiver 413 (e.g., Wi-Fi, WiMax) for corresponding signal communications. The communication device 400 can be a device such as a cellular telephone, a PDA with mobile communications capabilities, and messaging-centric devices. The communication component 410 also facilitates communications reception from terrestrial radio networks (e.g., broadcast), digital satellite radio networks, and Internet-based radio services networks.

The communication device 400 includes a display 412 for displaying text, images, video, telephony functions (e.g., a Caller ID function), setup functions, and for user input. For example, the display 412 can also be referred to as a "screen" that can accommodate the presentation of multimedia content (e.g., music metadata, messages, wallpaper, graphics, or other content). The display 412 can also display videos and can facilitate the generation, editing and sharing of video quotes. A serial I/O interface 414 is provided in communication with the processor 402 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 400, for example. Audio capabilities are provided with an audio I/O component 416, which can include a speaker for the output of audio signals related to, for example, indication that the user pressed the proper key or key combination to initiate the user feedback signal. The audio I/O component 416 also facilitates the input of audio signals through a microphone to record data and/or telephony voice data, and for inputting voice signals for telephone conversations.

The communication device 400 can include a slot interface 418 for accommodating a SIC (Subscriber Identity Component) in the form factor of a card Subscriber Identity Module (SIM) or universal SIM 420, and interfacing the SIM card 420 with the processor 402. However, it is to be appreciated that the SIM card 420 can be manufactured into the communication device 400, and updated by downloading data and software.

The communication device 400 can process IP data traffic through the communication component 410 to accommodate IP traffic from an IP network such as, for example, the Internet, a corporate intranet, a home network, a person area network, or other network, through an ISP or broadband cable provider. Thus, VoIP traffic can be utilized by the communication device 400 and IP-based multimedia content can be received in either an encoded or a decoded format.

A video processing component 422 (e.g., a camera) can be provided for decoding encoded multimedia content. The video processing component 422 can aid in facilitating the generation, editing, and sharing of video quotes. The communication device 400 also includes a power source 424 in the form of batteries and/or an AC power subsystem, which power source 424 can interface to an external power system or charging equipment (not shown) by a power I/O component 426.

The communication device 400 can also include a video component 430 for processing video content received and, for recording and transmitting video content. For example, the video component 430 can facilitate the generation, editing and sharing of video quotes. A location tracking component 432 facilitates geographically locating the communication device 400. As described hereinabove, this can occur when the user initiates the feedback signal automatically or manually. A user input component 434 facilitates the user initiating the quality feedback signal. The user input component 434 can also facilitate the generation, editing and sharing of video quotes. The user input component 434 can include such conventional input device technologies such as a keypad, keyboard, mouse, stylus pen, and/or touch screen, for example.

Referring again to the applications 406, a hysteresis component 436 facilitates the analysis and processing of hysteresis data, which is utilized to determine when to associate with the access point. A software trigger component 438 can be provided that facilitates triggering of the hysteresis component 436 when the Wi-Fi transceiver 413 detects the beacon of the access point. A SIP client 440 enables the communication device 400 to support SIP protocols and register the subscriber with the SIP registrar server. The applications 406 can also include a client 442 that provides at least the capability of discovery, play and store of multimedia content, for example, music.

The communication device 400, as indicated above related to the communication component 410, can include an indoor network radio transceiver 413 (e.g., Wi-Fi transceiver). This function supports the indoor radio link, such as IEEE 802.11, for the dual-mode GSM device (e.g., communication device 400). The communication device 400 can accommodate at least satellite radio services through a device (e.g., handset device) that can combine wireless voice and digital radio chipsets into a single device (e.g., single handheld device).

Figure 5:
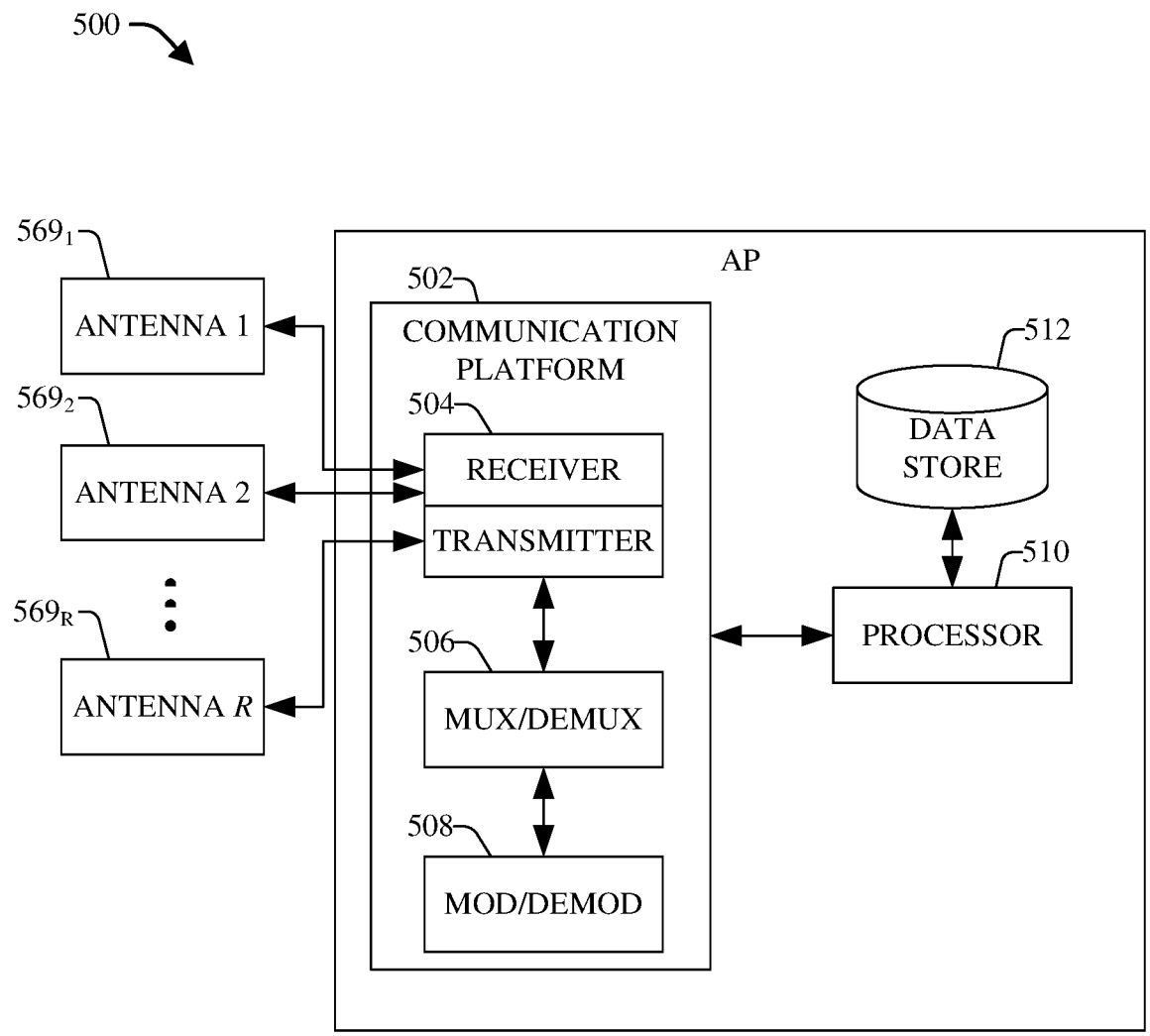
FIG. 5 illustrates a block diagram of an example access point, in accordance with various aspects and embodiments of the disclosed subject matter.

FIG. 5 illustrates a block diagram of an example access point (AP) 500 (e.g., macro base station, femto AP, pico AP, Wi-Fi AP, Wi-Fi-direct AP, or other type of AP), in accordance with various aspects and embodiments of the disclosed subject matter. The AP 500 can receive and transmit signal(s) from and to wireless devices like access points (e.g., base stations, femtocells, picocells, or other type of AP), access terminals (e.g., UEs), wireless ports and routers, and the like, through a set of antennas 5691-569R. In an aspect, the antennas 5691-569R are a part of a communication platform 502, which comprises electronic components and associated circuitry that can provide for processing and manipulation of received signal(s) and signal(s) to be transmitted. In an aspect, the communication platform 502 can include a receiver/transmitter 504 that can convert signal from analog to digital upon reception, and from digital to analog upon transmission. In addition, receiver/transmitter 504 can divide a single data stream into multiple, parallel data streams, or perform the reciprocal operation.

In an aspect, coupled to receiver/transmitter 504 can be a multiplexer/demultiplexer (mux/demux) 506 that can facilitate manipulation of signal in time and frequency space. The mux/demux 506 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), or another desired multiplexing scheme. In addition, mux/demux component 506 can scramble and spread information (e.g., codes) according to substantially any code known in the art, e.g., Hadamard-Walsh codes, Baker codes, Kasami codes, polyphase codes, and so on. A modulator/demodulator (mod/demod) 508 also can be part of the communication platform 502, and can modulate information according to multiple modulation techniques, such as frequency modulation, amplitude modulation (e.g., M-ary quadrature amplitude modulation (QAM), with M a positive integer), phase-shift keying (PSK), and the like.

The AP 500 also can comprise a processor(s) 510 that can be configured to confer and/or facilitate providing functionality, at least partially, to substantially any electronic component in or associated with the AP 500. For instance, the processor(s) 510 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, or other operations on data.

In another aspect, the AP 500 can include a data store 512 that can store data structures; code instructions; rate coding information; information relating to measurement of radio link quality or reception of information related thereto; information relating to communication conditions (e.g., SINR, RSRP, RSRQ, CQI, and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data communication rate, defined threshold data throughput values, defined threshold QoS values, or other type of threshold value), metadata, parameters, traffic flows, policies, rules, signaling, defined communication management criteria, communication management algorithms, protocols, interfaces, tools, and/or other information; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 510 can be coupled to the data store 512 in order to store and retrieve information (e.g., information, such as algorithms, relating to multiplexing/demultiplexing or modulation/demodulation; information relating to radio link levels; information relating to communication conditions (e.g., SINR, RSRP, RSRQ, CQI, and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data communication rate, defined threshold data throughput values, defined QoS values, or other type of threshold value), metadata, parameters, traffic flows, policies, rules, signaling, defined communication management criteria, communication management algorithms, protocols, interfaces, tools, and/or other information that can be desired to operate and/or confer functionality to the communication platform 502 and/or other operational components of AP 500.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 6-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
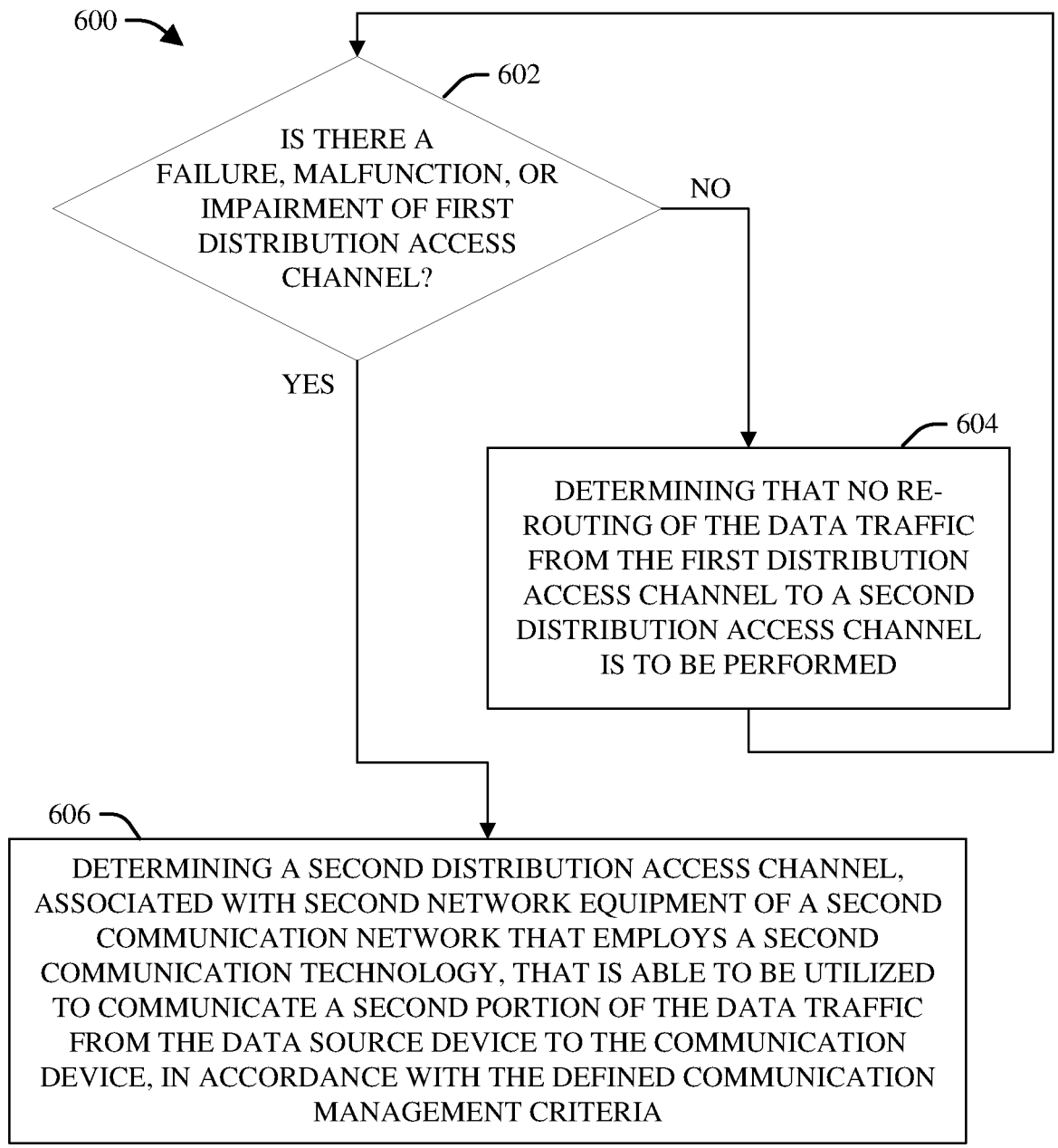
FIG. 6 illustrates a flow chart of an example method that can manage distribution access to data from a data source among and across multiple communication networks, in accordance with various aspects and embodiments of the disclosed subject matter.

FIG. 6 illustrates a flow chart of an example method 600 that can manage distribution access to data from a data source among and across multiple communication networks, in accordance with various aspects and embodiments of the disclosed subject matter. The method 600 can be employed by, for example, a system comprising the DAMC, a processor component (e.g., of or associated with the DAMC), and/or a data store (e.g., of or associated with the DAMC).

At 602, a determination can be made regarding whether there is a failure, a malfunction, or an impairment of a first distribution access channel associated with first network equipment of a first communication network that employs a first communication technology based at least in part on a result of analyzing communication condition information relating to a communication condition associated with the first distribution access channel, wherein the first distribution access channel was utilized to communicate a first portion of data traffic from a data source device to a communication device. The DAMC can monitor communication conditions associated with the communication networks. Based at least in part on the monitoring, the DAMC can receive the communication condition information relating to (e.g., representing or representative of) the communication conditions associated with the communication networks, including the distribution access channels, from various components (e.g., HE component, HFC node, wireless backhaul, wireless core, or other component) of or associated with the communication networks (e.g., the first communication network and the second communication network) and data sources devices, such as the data source device, such as described herein.

The DAMC can analyze the communication condition information to facilitate determining whether there is a failure, a malfunction, or an impairment of the first distribution access channel associated with the first network equipment of the first communication network that employs the first communication technology. Based at least in part on the results of the analysis of the communication condition information, the DAMC can determine whether there is a failure, a malfunction, or an impairment of the first distribution access channel associated with the first network equipment of the first communication network.

In response to determining that there is no failure, malfunction, or impairment of the first distribution access channel, at 604, a determination can be made that no re-routing of the data traffic from the first distribution access channel to a second distribution access channel is to be performed. From this point, the method 600 can return to reference numeral 602 and can proceed from that point. For instance, in response to determining that there is no failure, malfunction, or impairment of the first distribution access channel, the DAMC can determine that no re-routing of the data traffic from the first distribution access channel to a second distribution access channel is to be performed, can continue to monitor the communication conditions associated with the communication networks, and can collect and analyze communication condition information to facilitate determining whether a failure, a malfunction, or an impairment of the first distribution access channel (or another distribution access channel). In some embodiments, the first distribution access channel and/or the second distribution access channel can be or can comprise quantum links.

Referring again to reference numeral 602, if, instead, at 602, it is determined that there is a failure, a malfunction, or an impairment of the first distribution access channel, at 606, in response to determining that there is a failure, a malfunction, or an impairment of the first distribution access channel, a second distribution access channel can be determined, wherein the second distribution access channel can be associated with second network equipment of a second communication network that employs a second communication technology that is able to be utilized to communicate a second portion of the data traffic from the data source device to the communication device, in accordance with the defined communication management criteria. If, instead, the DAMC determines that there is a failure, a malfunction, or an impairment of the first distribution access channel, and in response to determining such failure, malfunction, or impairment, the DAMC can determine the second distribution access channel associated with the second network equipment of the second communication network, which employs the second communication technology, that is able to be utilized to communicate the second portion of the data traffic from the data source device to the communication device, in accordance with the defined communication management criteria. The DAMC also can determine whether the data traffic (e.g., the second portion of the data traffic) is to be re-routed to the second distribution access channel based at least in part on (e.g., in accordance with) the defined communication management criteria, which can be based at least in part on a policy that can indicate or specify the conditions or situations under which re-routing of data traffic from one distribution access channel to another distribution access channel is to be performed and/or when data traffic is not to be re-routed from one distribution access channel to another distribution access channel, such as described herein.

In some embodiments, the first communication network employing the first communication technology can be a wireline communication network, such as a cable communication network, and the second communication network employing the second communication technology can be a wireless communication network, such as a mobile or cellular communication network. In other embodiments, the first communication network employing the first communication technology can be the wireless communication network, such as the mobile or cellular communication network, and the second communication network employing the second communication technology can be the wireline communication network, such as the cable communication network.

Figure 7:
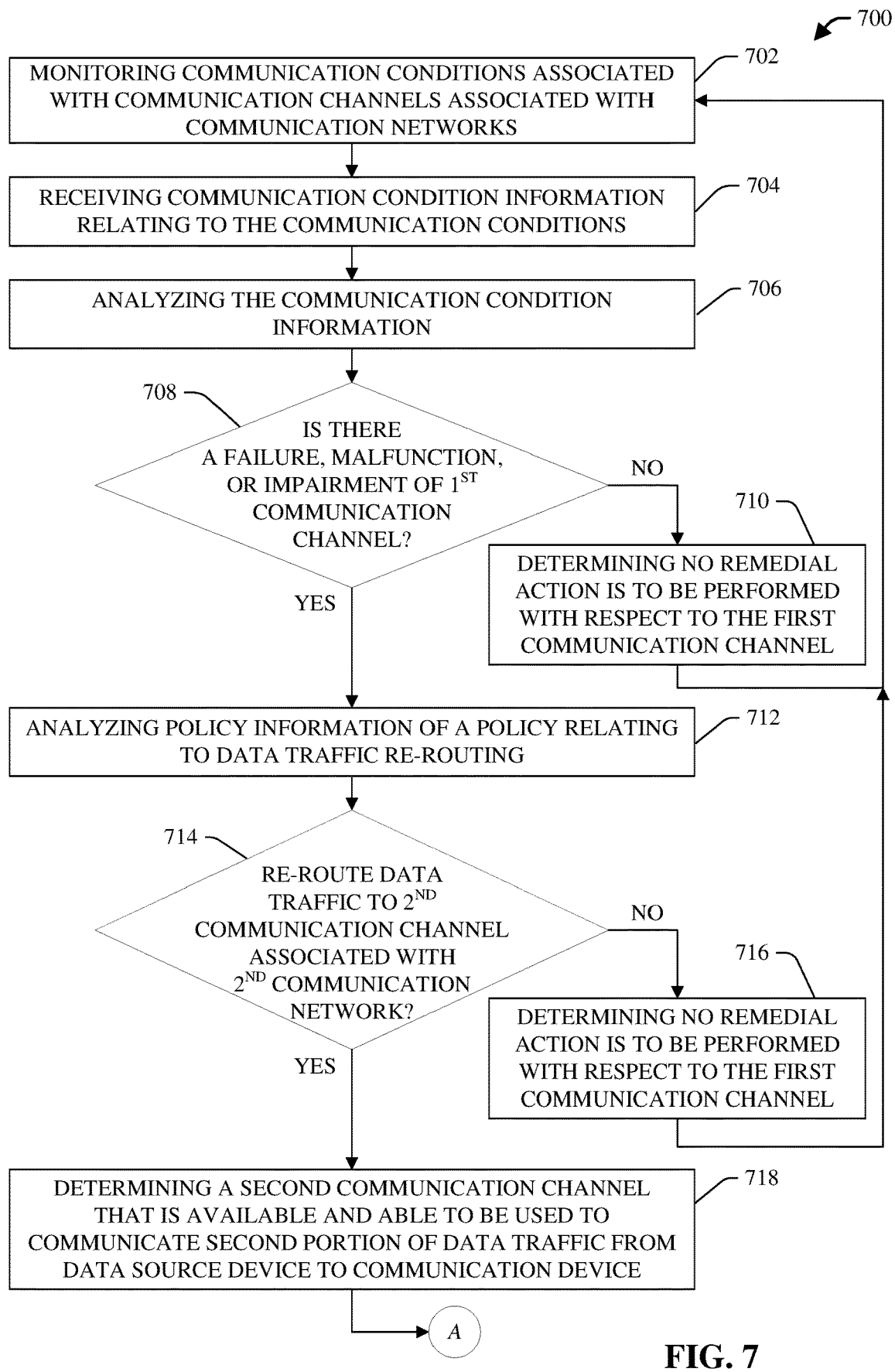
FIGS. 7 and 8 depict a flow chart of another example method that can manage distribution access to data from a data source among and across multiple communication networks, in accordance with various aspects and embodiments of the disclosed subject matter.
Figure 8:
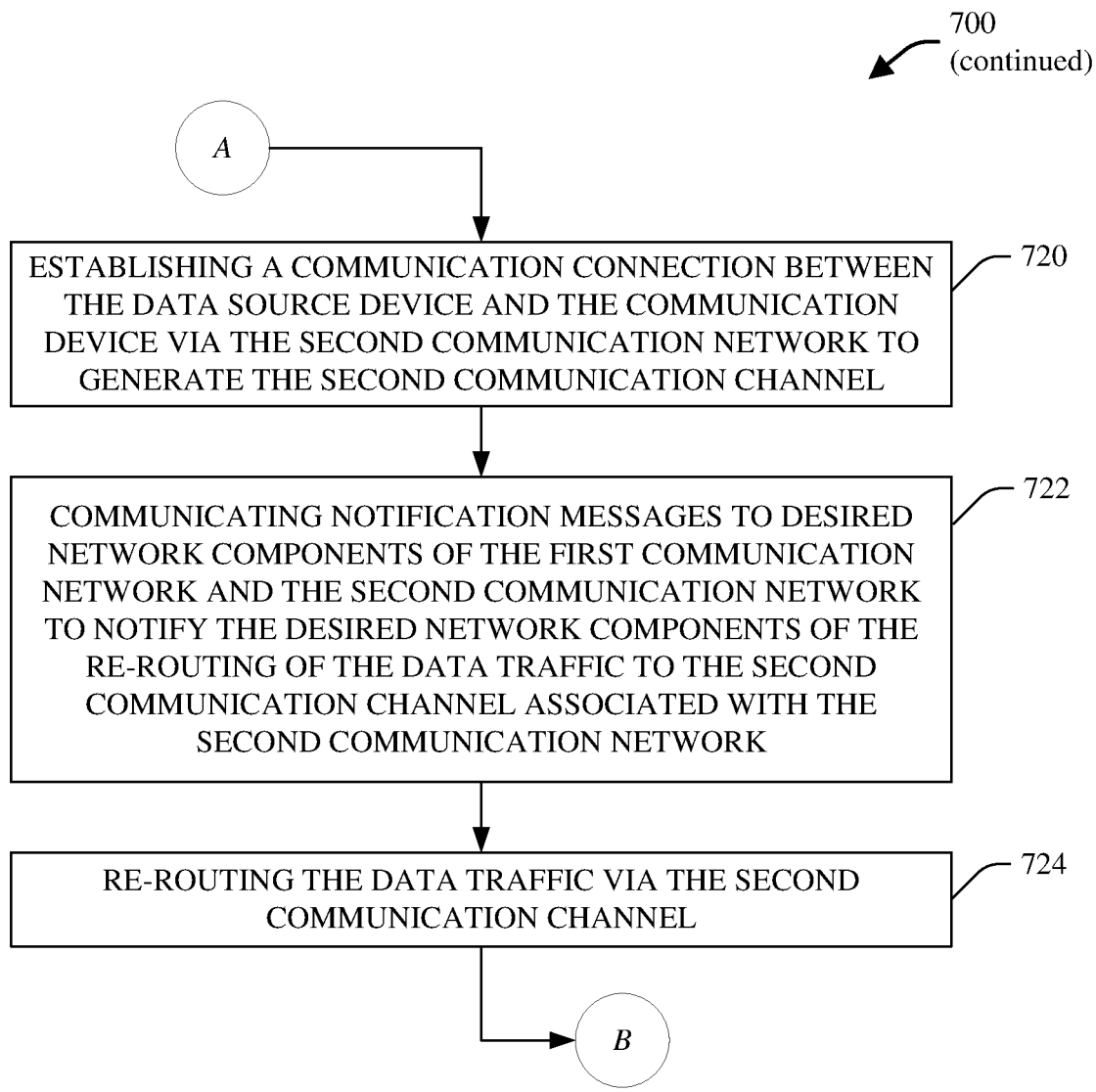

FIGS. 7 and 8 depict a flow chart of another example method 700 that can manage distribution access to data from a data source among and across multiple communication networks, in accordance with various aspects and embodiments of the disclosed subject matter. The method 700 can be employed by, for example, a system comprising the DAMC, a processor component (e.g., of or associated with the DAMC), and/or a data store (e.g., of or associated with the DAMC).

At 702, communication conditions associated with communication channels associated with communication networks can be monitored. The DAMC can monitor the communication conditions associated with the communication channels associated with the communication networks. The communication networks can comprise, for example, a first communication network that can employ a first communication technology and a second communication network that can employ a second communication technology.

In some embodiments, the first communication network employing the first communication technology can be a wireline communication network, such as a cable communication network, and the second communication network employing the second communication technology can be a wireless communication network, such as a mobile or cellular communication network. In other embodiments, the first communication network employing the first communication technology can be the wireless communication network, such as the mobile or cellular communication network, and the second communication network employing the second communication technology can be the wireline communication network, such as the cable communication network.

At 704, communication condition information relating to the communication conditions associated with the communication channels associated with the communication networks can be received. Based at least in part on the monitoring, the DAMC can receive the communication condition information relating to (e.g., representing or representative of) the communication conditions associated with the communication channels (e.g., distribution access channels) associated with the communication networks from various components (e.g., HE component, HFC node, wireless backhaul, wireless core, or other component) of or associated with the communication networks and data source devices, such as described herein.

At 706, the communication condition information can be analyzed. At 708, a determination can be made regarding whether there is a failure, a malfunction, or an impairment of a first communication channel associated with first network equipment of the first communication network that employs the first communication technology based at least in part on a result of the analysis of the communication condition information relating to a communication condition associated with the first communication channel, wherein the first communication channel was utilized to communicate a first portion of data traffic from a data source device to a communication device. The DAMC can analyze the communication condition information to facilitate determining whether there is a failure, a malfunction, or an impairment of a first communication channel (e.g., first distribution access channel) associated with first network equipment of the first communication network that employs the first communication technology. Based at least in part on the results of the analysis of the communication condition information, the DAMC can determine whether there is a failure, a malfunction, or an impairment of the first communication channel.

If it is determined that there is no failure, malfunction, or impairment of the first communication channel, at 710, a determination can be made that no remedial action is to be performed with respect to the first communication channel and associated data session. If the DAMC determines that there is no failure, malfunction, or impairment of the first communication channel, the DAMC can determine that no remedial action is to be performed with respect to the first communication channel and associated data session, in accordance with the defined communication management criteria. At this point, the method 700 can return to reference numeral 702, wherein communication conditions associated with communication channels associated with communication networks can continue to be monitored, and the method 700 can proceed from that point.

Referring again to reference numeral 708, if, instead, at 708, it is determined that there is a failure, a malfunction, or an impairment associated with the first communication channel, at 712, policy information of a policy relating to data traffic re-routing can be analyzed. At 714, a determination can be made regarding whether data traffic is to be re-routed to a second communication channel associated with the second communication network that can employ the second communication technology based at least in part on the results of the analysis of the policy, in accordance with the defined communication management criteria. The policy can relating to, indicate, or specify conditions under which data traffic can be re-routed to another communication channel (e.g., another communication channel associated with another communication network), such as described herein. In response to determining that there is a failure, a malfunction, or an impairment associated with the first communication channel, the DAMC can analyze the policy information of the policy to facilitate determining whether, in accordance with the policy, data traffic being communicated from the data source device to the communication device is to be re-routed to the second communication channel associated with the second communication network due to detection of the failure, malfunction, or impairment associated with the first communication channel associated with the first communication network.

At 716, if it is determined that the data traffic is not to be re-routed to the second communication channel, a determination can be made that no remedial action is to be performed with respect to the data session between the data source device and the communication device. If the DAMC determines that the data traffic is not to be re-routed to the second communication channel based at least in part on the policy analysis, the DAMC can determine that no remedial action is to be performed with respect to the first communication channel and associated data session, in accordance with the defined communication management criteria. In some embodiments, at this point, the method 700 can return to reference numeral 702, wherein communication conditions associated with communication channels associated with communication networks can continue to be monitored, and the method 700 can proceed from that point.

Referring again to reference numeral 714, if, instead, at 714, it is determined that the data traffic can be re-routed to the second communication channel associated with the second communication network, in accordance with the policy, at 718, a second communication channel that is available and able to be used to communicate a second portion of the data traffic from the data source device to the communication device can be determined based at least in part on routing-related information that can be contained in the logic table. If, instead, the DAMC determines that the data traffic can be re-routed to the second communication channel associated with the second communication network, in accordance with the policy (e.g., providing that there is such second communication channel available and able to communicate the data traffic), the DAMC can determine the second communication channel that is available and able to be used to communicate the second portion of the data traffic from the data source device to the communication device based at least in part on the results of an analysis of routing-related information that can be contained in the logic table. At this point, the method 700 can proceed to reference point A, wherein, in some embodiments, as depicted in FIG. 8, the method 700 can proceed from reference point A, such as described herein.

At 720, a communication connection can be established between the data source device and the communication device via the second communication network to generate the second communication channel. The DAMC can initiate or facilitate establishing the communication connection between the data source device and the communication device via the second communication network to generate the second communication channel between the data source device and the communication device. In some embodiments, the communication connection can be a quantum connection (e.g., quantum link). In certain embodiments, to facilitate establishing (e.g., setting up) the quantum connection, the DAMC can instantiate or generate a virtual instance for a quantum node associated with the second communication network that can be utilized to facilitate establishing, generating, or maintaining the communication connection and associated second communication channel.

At 722, notification messages can be communicated to desired network components of the first communication network and the second communication network to notify the desired network components of the re-routing of the data traffic to the second communication channel associated with the second communication network. The DAMC can generate the notification messages and can communicate the notification messages to various desired (e.g., appropriate, suitable, wanted, or necessary) network components of or associated with the first communication network and second communication network to notify the desired network components of the problem (e.g., failure, malfunction, or impairment) associated with the first communication channel associated with the first communication network and the re-routing of the data traffic from the first communication channel to the second communication channel associated with the second communication network.

At 724, the data traffic can be re-routed via the second communication channel. The DAMC can re-route or facilitate re-routing a second portion of the data traffic being communicated between the data source device and the communication device via the second communication channel. At this point, the method 700 can proceed to reference point B, wherein, in some embodiments, as depicted in FIG. 9, the method 900 of FIG. 9 can proceed from reference point B, such as described herein.

Figure 9:
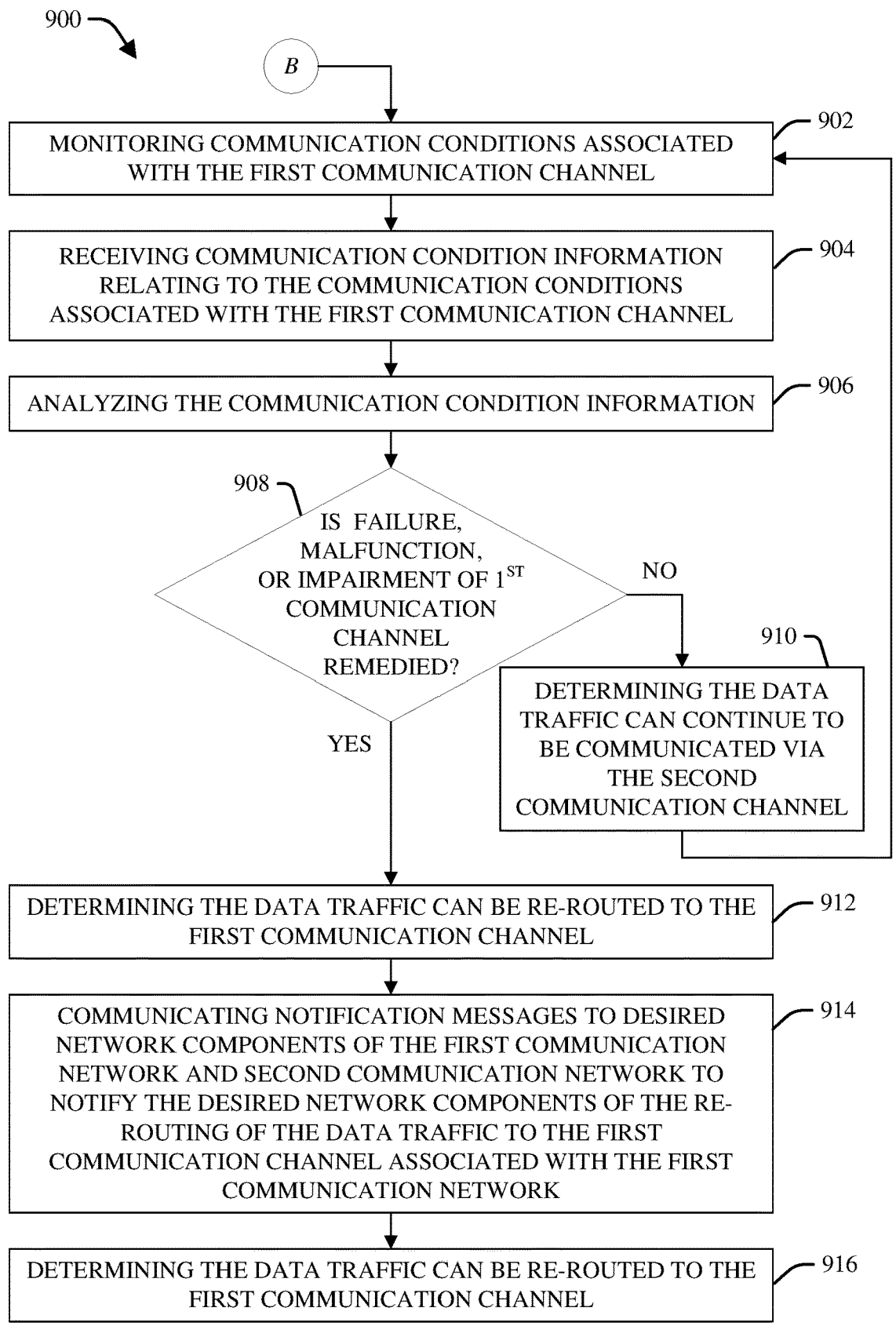
FIG. 9 illustrates a flow chart of another example method that can determine whether a communication channel problem associated with an original communication channel has been remedied and data traffic is to be re-routed back to the original communication channel from an alternate communication channel to facilitate managing distribution access to data from a data source among and across multiple communication networks, in accordance with various aspects and embodiments of the disclosed subject matter.

FIG. 9 illustrates a flow chart of another example method 900 that can determine whether a communication channel problem associated with an original communication channel has been remedied and data traffic is to be re-routed back to the original communication channel from an alternate communication channel to facilitate managing distribution access to data from a data source among and across multiple communication networks, in accordance with various aspects and embodiments of the disclosed subject matter. The method 900 can be employed by, for example, a system comprising the DAMC, a processor component (e.g., of or associated with the DAMC), and/or a data store (e.g., of or associated with the DAMC). In some embodiments, the method 900 can proceed from reference point B, as depicted in FIG. 8. In certain embodiments, the method 900 can be employed when data traffic associated with the data source device and the communication device has been re-routed from the first communication channel associated with the first communication network to the second communication channel associated with the second communication network due to a problem (e.g., failure, malfunction, or impairment) that occurred with regard to the first communication channel.

At 902, communication conditions associated with the first communication channel can be monitored. The DAMC can monitor the communication conditions associated with the first communication channel associated with the first communication network to facilitate determining whether the problem with the first communication channel has been remedied (e.g., fixed, corrected, or rectified).

At 904, communication condition information relating to the communication conditions associated with the first communication channel can be received. Based at least in part on the monitoring, the DAMC can receive the communication condition information relating to (e.g., representing or representative of) the communication conditions associated with the first communication channel (e.g., first distribution access channel) associated with the first communication network from various components (e.g., cable HE component, HFC node, wireless backhaul, wireless core, or other component) of or associated with the first communication network and/or the data source device, such as described herein.

At 906, the communication condition information can be analyzed. At 908, a determination can be made regarding whether the failure, malfunction, or impairment associated with the first communication channel has been remedied. The DAMC can analyze the communication condition information to facilitate determining whether the problem (e.g., failure, malfunction, or impairment) of or associated with the first communication channel has been remedied. Based at least in part on the results of the analysis of the communication condition information, the DAMC can determine whether the problem of or associated with the first communication channel has been remedied.

If it is determined that the failure, malfunction, or impairment associated with the first communication channel has not been remedied, at 910, a determination can be made that the data traffic associated with the data source device and communication device can continue to be communicated via the second communication channel. At this point, the method 900 can proceed back to reference numeral 902 where the communication conditions associated with the first communication channel can continue to be monitored, and the method 900 can proceed from that point.

Referring again to reference numeral 908, if, instead, at 908, it is determined that the failure, malfunction, or impairment associated with the first communication channel has been remedied, at 912, a determination can be made that the data traffic associated with the data source device and communication device can be re-routed to the first communication channel. If the DAMC determines that the failure, malfunction, or impairment associated with the first communication channel has been remedied, the DAMC can determine that the data traffic associated with the data source device and communication device can be re-routed from the second communication channel associated with the second communication network for communication via the first communication channel associated with the first communication network.

At 914, notification messages can be communicated to desired network components of the first communication network and the second communication network to notify the desired network components of the re-routing of the data traffic to the first communication channel associated with the first communication network. The DAMC can generate the notification messages and can communicate the notification messages to various desired (e.g., appropriate, suitable, wanted, or necessary) network components of or associated with the first communication network and second communication network to notify the desired network components that the problem (e.g., failure, malfunction, or impairment) associated with the first communication channel associated with the first communication network has been remedied and/or of the re-routing of the data traffic from the second communication channel associated with the second communication network to the first communication channel.

At 916, the data traffic can be re-routed via the first communication channel. The DAMC can re-route or facilitate re-routing a third portion of the data traffic being communicated between the data source device and the communication device via the first communication channel.

Figure 10:
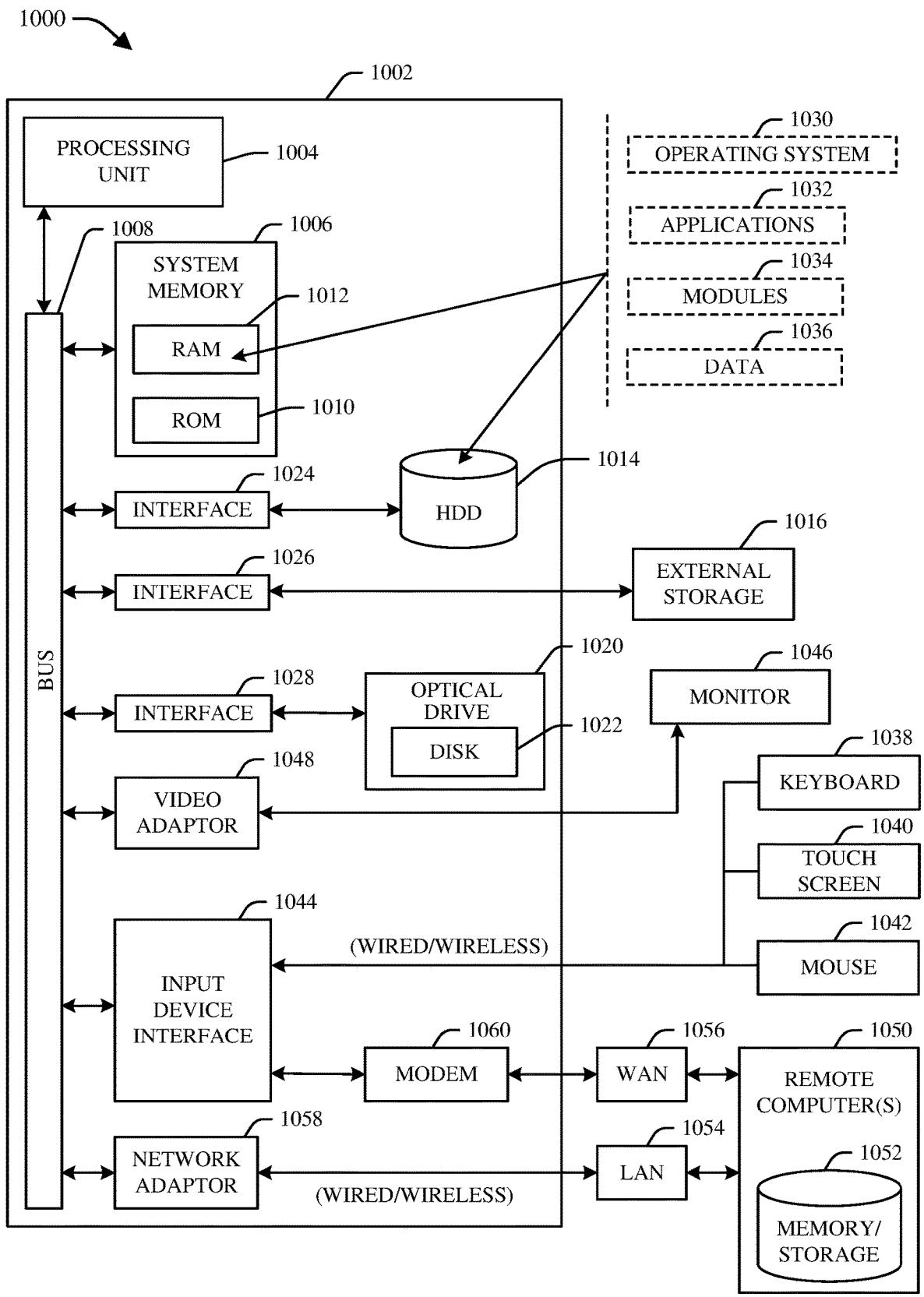
FIG. 10 is a schematic block diagram illustrating a suitable computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, or other type of storage device) and an optical disk drive 1020 (e.g., which can read or write from a CD-ROM disc, a DVD, a BD, or other disk drive). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH™ interface, or other type of interface.

A monitor 1046 or other type of display device can be also connected to the system bus 1008 via an interface, such as a video adapter 1048. In addition to the monitor 1046, a computer typically includes other peripheral output devices (not shown), such as speakers, printers, or other type of peripheral output device.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other equipment or entity), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other alphanumeric character) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well non-mobile networks (e.g., the internet, data service network such as internet protocol television (IPTV), or other network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, or other type of magnetic storage device), optical discs (e.g., compact disc (CD), digital versatile disc (DVD), blu-ray disc (BD), or other type of optical disc), smart cards, and memory devices comprising volatile memory and/or non-volatile memory (e.g., flash memory devices, such as, for example, card, stick, key drive, or other type of memory device), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, base station, communication network, DAMC, application, service, AI component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a system comprising a processor, whether there is a failure associated with a first distribution access channel associated with first network equipment of a first communication network that employs a first communication technology based on a result of analyzing communication condition information representing a communication condition associated with the first distribution access channel, wherein the first distribution access channel was utilized to communicate a first portion of data traffic from a data source device to a device;
   in response to determining that there is the failure associated with the first distribution access channel, determining, by the system, a second distribution access channel associated with second network equipment of a second communication network that employs a second communication technology that is able to be utilized to communicate a second portion of the data traffic from the data source device to the device;
   in response to determining that the second distribution access channel is able to be utilized to communicate the second portion of the data traffic from the data source device to the device, facilitating, by the system, establishing the second distribution access channel; and
   communicating, by the system, the second portion of the data traffic from the data source device to the device via the second distribution access channel associated with the second network equipment of the second communication network, wherein the second distribution access channel is partially routed through the second communication network and partially routed through a part of the first communication network that is determined to not be experiencing the failure.

2. The method of claim 1, wherein the first distribution access channel is associated with a first quantum connection, and wherein the second distribution access channel is associated with a second quantum connection.

3. The method of claim 2, further comprising:
   to facilitate establishing the second quantum connection and the establishing of the second distribution access channel, instantiating, by the system, a virtual instance of a quantum node associated with the second communication network.

4. The method of claim 1, wherein the communication condition information representing the communication condition comprises first communication condition information, wherein the result is a first result, and wherein the method further comprises:
   monitoring, by the system, the communication condition associated with the first distribution access channel;
   receiving, by the system, second communication condition information representing the communication condition associated with the first distribution access channel;
   determining, by the system, whether the failure associated with the first distribution access channel has been rectified based on a second result of analyzing the second communication condition information; and
   in response to determining that the failure associated with the first distribution access channel has been rectified and the first distribution access channel has been re-established, routing, by the system, a third portion of the data traffic from the data source device to the device via the first distribution access channel.

5. The method of claim 1, wherein the first communication technology comprises a wireline communication technology, and wherein the second communication technology comprises a wireless communication technology.

6. The method of claim 1, wherein the first communication technology comprises a wireless communication technology, and wherein the second communication technology comprises a wireline communication technology.

7. The method of claim 1, further comprising:
   in response to determining that there is the failure associated with the first distribution access channel, determining, by the system, whether the second distribution access channel is to be established to communicate the second portion of the data traffic from the data source device to the device based on policy information representing a policy, wherein the policy relates to a cost associated with establishing the second distribution access channel, a priority level associated with the data traffic, or an availability of resources to be used to establish the second distribution access channel.

8. The method of claim 1, further comprising:
   in response to determining that there is the failure associated with the first distribution access channel, generating, by the system, a notification message relating to the failure; and
   communicating, by the system, the notification message to a monitoring device to notify the monitoring device regarding the failure associated with the first distribution access channel to facilitate rerouting the second portion of the data traffic from the data source device to the device via the second distribution access channel.

9. The method of claim 1, further comprising:
   receiving, by the system, the communication condition information from a head end device, a hybrid fiber-coaxial node, a wireless backhaul device, a wireless core network device, or the data source device.

10. A system, comprising:
    a processor; and
    a memory that stores executable instructions that, when executed by the processor, facilitate performance of operations, the operations comprising:

determining whether there is a communication-related malfunction associated with a first communication channel associated with first network equipment of a first communication network that utilizes a first communication technology based on a result of an analysis of communication condition data relating to a communication condition associated with the first communication channel, wherein the first communication channel was utilized to transmit a first portion of data traffic from a data source device to a device;

in response to determining that there is the communication-related malfunction associated with the first communication channel, determining a second communication channel that is able to be utilized to transmit a second portion of the data traffic from the data source device to the device, wherein the second communication channel is associated with second network equipment of a second communication network that utilizes a second communication technology;

in response to determining that the second communication channel is able to be utilized to transmit the second portion of the data traffic from the data source device to the device, generating the second communication channel; and transmitting the second portion of the data traffic from the data source device to the device via the second communication channel associated with the second network equipment of the second communication network, wherein the second communication channel is partially routed through the second communication network and partially routed through a part of the first communication network that is determined to not be experiencing the communication-related malfunction.

11. The system of claim 10, wherein the first communication channel is associated with a first quantum connection, and wherein the second communication channel is associated with a second quantum connection.

12. The system of claim 11, wherein the operations further comprise:
to facilitate generating the second quantum connection and the generating of the second communication channel, instantiating a virtual instance of a quantum node associated with the second communication network.

13. The system of claim 10, wherein the communication condition data relating to the communication condition comprises first communication condition data, wherein the result is a first result, wherein the analysis is a first analysis, and wherein the operations further comprise:
monitoring the communication condition associated with the first communication channel;
receiving second communication condition data relating to the communication condition associated with the first communication channel from a head end device, a hybrid fiber-coaxial node, a wireless backhaul device, a wireless core network device, or the data source device;
determining whether the communication-related malfunction associated with the first communication channel has been remedied based on a second result of a second analysis of the second communication condition data; and
in response to determining that the communication-related malfunction associated with the first communication channel has been remedied and the first communication channel has been re-established, routing a third portion of the data traffic from the data source device to the device via the first communication channel.

14. The system of claim 10, wherein the first communication technology comprises a wireline communication technology, and wherein the second communication technology comprises a wireless communication technology.

15. The system of claim 10, wherein the first communication technology comprises a wireless communication technology, and wherein the second communication technology comprises a wireline communication technology.

16. The system of claim 10, wherein the operations further comprise:
in response to determining that there is the communication-related malfunction associated with the first communication channel, determining whether the second communication channel is to be established to transmit the second portion of the data traffic from the data source device to the device based on a defined communication management criterion that relates to a cost associated with generating the second communication channel, a priority level associated with the data traffic, or an availability of resources to be used to generate the second communication channel.

17. A non-transitory machine-readable medium, comprising executable instructions that, when executed by a processor, facilitate performance of operations, the operations comprising:
determining whether there is an impairment associated with a first communication channel associated with first network equipment of a first communication network that employs a first communication technology based on a result of evaluating communication condition information relating to a communication condition associated with the first communication channel, wherein the first communication channel was utilized to communicate a first portion of data traffic from a data source device to a user equipment, and wherein the first communication channel is associated with a first quantum connection;
in response to determining that there is the impairment associated with the first communication channel, determining a second communication channel associated with second network equipment of a second communication network that employs a second communication technology that is able to be utilized to communicate a second portion of the data traffic from the data source device to the user equipment, wherein the second communication channel is associated with a second quantum connection;
in response to determining that the second communication channel is able to be utilized to communicate the second portion of the data traffic from the data source device to the user equipment, initiating generation of the second communication channel; and
communicating the second portion of the data traffic from the data source device to the user equipment via the second communication channel associated with the second network equipment of the second communication network,
wherein the second communication channel is partially routed through the second communication network and partially routed through a part of the first communication network that is determined to not be experiencing the impairment, and wherein one of:
the first communication network is a wireless communication network and the second communication network is the wireline communication network; or
the second communication network is the wireless communication network and the first communication network is the wireline communication network.

18. The non-transitory machine-readable medium of claim 17, the operations further comprising:
in response to determining that there is the impairment associated with the first communication channel, determining whether the second communication channel is to be established to communicate the second portion of the data traffic from the data source device to the user equipment based on policy information representing a policy, wherein the policy relates to a cost associated with establishing the second communication channel, a priority level associated with the data traffic, or an availability of resources to be used to establish the second communication channel.

19. The non-transitory machine-readable medium of claim 17, the operations further comprising:
in response to determining that there is the impairment associated with the first communication channel, generating a notification message relating to the impairment; and
communicating the notification message to a monitoring device to notify the monitoring device regarding the impairment associated with the first communication channel to facilitate rerouting the second portion of the data traffic from the data source device to the user equipment via the second communication channel.

20. The non-transitory machine-readable medium of claim 17, the operations further comprising:
receiving the communication condition information from a head end device, a hybrid fiber-coaxial node, a wireless backhaul device, a wireless core network device, or the data source device.

* * * * *